US010167416B2

(12) United States Patent
Clay et al.

(10) Patent No.: US 10,167,416 B2
(45) Date of Patent: Jan. 1, 2019

(54) HIGH PERFORMANCE WATER-BASED ADHESION COMPOSITIONS AND APPLICATIONS

(71) Applicant: HONEYWELL INTERNATIONAL INC., Morristown, NJ (US)

(72) Inventors: John D. Clay, Randolph, NJ (US); Stephen Armstrong, Chester (GB); George S. Leotsakos, Sparta, NJ (US); Michael Jablon, Ramsey, NJ (US); Wen B. Chiao, Bridgewater, NJ (US); Rakesh Vig, Durham, CT (US)

(73) Assignee: HONEYWELL INTERNATIONAL INC., Morris Plain, NJ (US)

( * ) Notice: Subject to any disclaimer, the term of this patent is extended or adjusted under 35 U.S.C. 154(b) by 0 days.

(21) Appl. No.: 14/686,486

(22) Filed: Apr. 14, 2015

(65) Prior Publication Data
US 2015/0218426 A1    Aug. 6, 2015

Related U.S. Application Data

(63) Continuation-in-part of application No. 13/750,844, filed on Jan. 25, 2013.

(60) Provisional application No. 61/979,575, filed on Apr. 15, 2014.

(51) Int. Cl.
| | |
|---|---|
| *C09D 11/107* | (2014.01) |
| *C09J 133/08* | (2006.01) |
| *C09J 133/12* | (2006.01) |
| *C08K 5/10* | (2006.01) |
| *C08K 5/521* | (2006.01) |
| *C09J 7/38* | (2018.01) |
| *C09J 123/08* | (2006.01) |
| *C09J 123/30* | (2006.01) |
| *C09D 11/00* | (2014.01) |
| *C09J 131/04* | (2006.01) |
| *C09J 125/04* | (2006.01) |
| *C08L 33/08* | (2006.01) |
| *C08L 33/12* | (2006.01) |
| *C09J 4/06* | (2006.01) |
| *C08L 23/08* | (2006.01) |
| *C08L 23/30* | (2006.01) |
| *C08L 51/06* | (2006.01) |

(52) U.S. Cl.
CPC .............. *C09J 133/08* (2013.01); *C08K 5/10* (2013.01); *C08K 5/521* (2013.01); *C08L 23/0869* (2013.01); *C08L 23/30* (2013.01); *C08L 33/08* (2013.01); *C08L 33/12* (2013.01); *C08L 51/06* (2013.01); *C09D 11/107* (2013.01); *C09J 4/06* (2013.01); *C09J 123/0869* (2013.01); *C09J 123/30* (2013.01); *C09J 125/04* (2013.01); *C09J 131/04* (2013.01); *C09J 133/12* (2013.01); *C09D 11/00* (2013.01); *C09J 2205/102* (2013.01); *C09J 2423/00* (2013.01); *C09J 2423/04* (2013.01); *Y10T 428/2891* (2015.01)

(58) Field of Classification Search
None
See application file for complete search history.

(56) References Cited

U.S. PATENT DOCUMENTS

| | | |
|---|---|---|
| 4,043,959 A | 8/1977 | Frye |
| 4,110,290 A | 8/1978 | Mori et al. |
| 4,853,427 A | 8/1989 | Herten et al. |
| 5,281,473 A | 1/1994 | Ishiwata et al. |
| 5,284,891 A | 2/1994 | Wouters et al. |
| 5,318,835 A | 6/1994 | Sawamoto et al. |
| 5,706,133 A | 1/1998 | Orensteen et al. |
| 6,037,054 A | 3/2000 | Shirai et al. |

(Continued)

FOREIGN PATENT DOCUMENTS

| | | |
|---|---|---|
| CN | 1212007 A | 3/1999 |
| CN | 1278850 A | 1/2001 |

(Continued)

OTHER PUBLICATIONS

EP Extended Search Report for Application No. EP 13746150.5 dated Jul. 3, 2015.
PCT Written Opinion of the International Searching Authority for Application No. PCT/US 15/25955 dated Jul. 8, 2015.
"Handbook of Pressure Sensitive Adhesive Technology" Gerhard et al. BASF AG and Donatas Salas and Associates Third edition— Copyright 1999 by Satas & Associates pp. 444-458 with contents pp. V-VIII.

(Continued)

*Primary Examiner* — Frank D Ducheneaux
(74) *Attorney, Agent, or Firm* — Lorenz & Kopf, LLP

(57) ABSTRACT

An adhesion composition comprising a) a first polymer that is selected from the group consisting of acrylic polymers, acrylonitrile butadiene, butyl rubber, cellulose acetate, cellulose butyrate, epoxy resins, ethylene vinyl acetate, natural rubber, neoprene, phenolic polymers, polyurethanes, polyvinyl acetate, polyvinyl alcohol, styrene butadiene rubber, casein, dextrin, starch, copolymers thereof and combinations thereof; b) a second polymer selected from the group consisting of ethylene-acrylic acid copolymer, oxidized polyethylene, oxidized ethylene-vinyl acetate copolymer, maleated polyolefin and combinations thereof; and c) a surfactant; where the composition is water-based, having a solids content of greater than about 30% based on the total weight of the composition, with a particle size of about 10 nm to about 2000 nm, and is adapted for adhesion to substrates; and where the first and second polymers are different. The adhesion composition can also comprise a tackifier resin selected from the group consisting of rosin ester resin, rosin acid resin, synthetic hydrocarbon resin, synthetic terpenic resin and combinations thereof. Applications of the composition are also disclosed.

12 Claims, 7 Drawing Sheets

(56) References Cited

U.S. PATENT DOCUMENTS

| | | |
|---|---|---|
| 6,235,822 B1 | 5/2001 | Whetten et al. |
| 6,368,707 B1 | 4/2002 | Kamiya et al. |
| 6,552,118 B2 | 4/2003 | Fujita et al. |
| 6,805,954 B2 | 10/2004 | Silverberg et al. |
| 6,855,386 B1 | 2/2005 | Daniels et al. |
| 7,070,051 B2 | 7/2006 | Kanner et al. |
| 7,442,739 B1 | 10/2008 | Hatfield |
| 7,867,610 B2 | 1/2011 | Takahashi et al. |
| 7,919,182 B2 | 4/2011 | Hamada et al. |
| 7,923,503 B2 | 4/2011 | Takahashi et al. |
| 8,022,125 B2 | 9/2011 | Naito et al. |
| 8,633,263 B2 | 1/2014 | Jing et al. |
| 8,846,833 B2 | 9/2014 | Prenzel |
| 2002/0061945 A1 | 5/2002 | Oates et al. |
| 2005/0014883 A1 | 1/2005 | Blankenship et al. |
| 2005/0048303 A1 | 3/2005 | Henderson et al. |
| 2007/0021566 A1 | 1/2007 | Tse et al. |
| 2009/0203847 A1 | 8/2009 | Ellis et al. |
| 2010/0227165 A1 | 9/2010 | Maruyama et al. |
| 2011/0054117 A1 | 3/2011 | Hall |
| 2011/0251542 A1 | 10/2011 | Buus et al. |
| 2012/0189835 A1 | 7/2012 | Takarada et al. |
| 2013/0202885 A1 | 8/2013 | Dodge et al. |
| 2014/0011928 A1* | 1/2014 | Iwasawa ............ C08G 18/6659 524/249 |

FOREIGN PATENT DOCUMENTS

| | | | |
|---|---|---|---|
| EP | 0259842 A2 | 3/1988 | |
| EP | 0259842 B2 | 11/1993 | |
| JP | 2001089729 A | 4/2001 | |
| WO | WO 2012/133752 A1 * | 4/2012 | ............ C09D 175/04 |

OTHER PUBLICATIONS

R. H. Bott, et al; "Miscibility of Poly(vinyl acetate) and Vinyl Acetate-Ethylene Copolymers with Styrene-Acrylic Acid and Acrylate-Acrylic Acid Copolymers," Air Products and Chemicals, Inc., Allentown, Pennsylvania 181 95, Oct. 25, 20111.

Czech, Z., "Crosslinking of pressure sensitive adhesive based on water-borne acrylate," Polymer International, v52, n 3, p. 347-357 Mar. 2003; Received, Oct. 25, 2011.

Litz, Ronald., "Developments in Ethylene-Based Hot Melt Adhesives," Adhesives age, v 17, n 8, p. 35-38, Aug. 1974.

Yamakawa, S. "Hot-Melt Adhesive Bonding of Polyethylene With Ethylene Copolymers," Polymer Engineering and Science, v 16, n 6, p. 411-418, Jun. 1976.

Chinese Office Action for Patent Application No. 201380017731.0 dated Feb. 23, 2017.

Japan Patent Office, Office Action in Japanese Patent Application No. 2014-556568 dated May 17, 2017.

USPTO, Final Office Action in U.S. Appl. No. 13/750,844 dated May 23, 2017.

Extended EP Search Report for Application No. 15780235.6 dated Oct. 26, 2017.

State Intellectual Property Office of the People's Republic of China, Office Action in Chinese Patent Application No. 201380017731.0 dated Sep. 11, 2017.

Chinese Office Action for Application No. 201580031880.1 dated May 30, 2018.

Mexican Office Action for Application No. 2014/009521 dated Jul. 23, 2018.

* cited by examiner

7A

7B

HIGH PERFORMANCE WATER-BASED ADHESION COMPOSITIONS AND APPLICATIONS

CROSS REFERENCE TO RELATED APPLICATIONS

This application is a continuation-in-part under U.S.C. § 120 of U.S. application Ser. No. 13/750,844, filed on Jan. 25, 2013, which claims priority under 35 U.S.C. § 119(e) to U.S. Provisional Patent Application No. 61/596,622, filed on Feb. 8, 2012. This application also claims priority under 35 U.S.C. § 119(e) to U.S. Provisional Patent Application No. 61/979,575, filed on Apr. 15, 2014. The entire disclosures of all of the above applications are incorporated herein by reference.

FIELD OF THE INVENTION

The invention relates to water-based adhesion compositions and applications using same.

BACKGROUND OF THE INVENTION

Adhesives, inks and coatings are widely used in industry. In particular, water-based formulations of such materials are advantageous in terms of cost and toxicological properties, and potentially have greater acceptance as renewable and so-called "green" alternatives to solvent-based and hot melt adhesive formulations.

Water-based adhesives, pressure sensitive adhesives and sealants may be formulated with a wide range of synthetic and natural polymer chemistries. For simplicity these product groups are simply described as "adhesives" herein.

Today water-based adhesives are exploited in numerous end-use markets, where their easy-to-use format and environmentally friendly chemistry are favored, including:
  paper, board and related products, e.g. converting and packaging, disposable non-wovens, hygiene products, pressure sensitives, corrugated board and remoistenable adhesives;
  leather and textiles, e.g. seaming and stitching, lamination, fabric repair and bonding of underlays, rugs and carpets;
  consumer and "Do It Yourself" (DIY) products, e.g. office products, adhesive gels, liquid adhesives;
  products for building, construction, civil engineering and craftsmen, e.g. on-site and off-site, adhesives;
  woodworking and joinery, e.g. cabinet making, furniture manufacture, door and window frame manufacture, structural joinery, upholstery, plywood, particle board and laminates; and
  medical tapes and wound dressings.

Water-based heat seal adhesives belong to a class of materials that produce films or coatings upon drying. Heat seal adhesives are thermoplastic materials that can be coated onto a substrate, dried, and then reactivated by heat and pressure. Upon drying, they form a coating that can be heat-activated and bonded to other substrates, such as the foil seal on a commercial yogurt container. They are non-tacky materials at ambient temperature and become molten liquids upon heat activation during the product assembly process. They differ from conventional hot melt adhesives, which that are applied in a molten state and cooled between substrates.

Heat seal adhesives have been commonly used in the packaging industry, including for film laminating, pouch construction and blister-pack sealing.

The formulation of water-based packaging inks continues to present challenges. In modern printing, for example, an important challenge for water-based inks is to be effective and efficient when use in the high press speeds (in excess of 1000 ft/min) commonly used for solvent inks. Water does not dry as quickly as most organic solvents, but water nevertheless has benefits. Many workers in the field have focused on modifying existing printing equipment to work better with water-based inks. Further, on the raw material side there is a keen interest in developing faster drying emulsions, and a need is recognized in the industry for a transition from solvent inks to water-based inks if an effective solution can be found.

Applicants believe that with the implementation of an appropriated solucion, as is provided by the invention described herein, the benefits that can be achieved using water-based inks and coatings for printing and lamination applications include:
  low or no Volatile Organic Compound (VOC) components;
  lower odor;
  ink/coating uses sustainable resources;
  non-flammable, therefore less regulated environmentally;
  longer ink stability as compared to solvent-based inks;
  easier to formulate inks for direct or indirect food contact;
  improved plant working conditions; and
  increased life of photopolymer plates (Flexography).

Thus, there remains a continuing need for improved water-based adhesives, inks and coatings with better adhesion to difficult, low-energy substrates, and better cohesion and resistance to shear. Preferred aspects of the present invention address and provide effective solutions to these and other needs.

SUMMARY OF THE INVENTION

In one embodiment, the present invention provides an adhesion composition. As used herein, the term adhesion composition refers to a composition that provides adhesive and/or cohesive properties, and preferably both, and can be used to bond or adhere, including releasabley bond or adhere, to one or more surfaces or materials. Alternatively, the present adhesion compositions can be utilized as an additive to or a component of a composition which can benefit from and/or require the beneficial properties, including adhesion properties, imparted by the present compositions. By way of example, the present adhesion compositions are used in certain preferred embodiments as an additive and/or a component of water-based adhesives, water-based inks, water-based paints, water-based coatings and the like.

In preferred embodiments, the present adhesion composition comprises: (a) a first polymer selected from the group consisting of acrylic polymers, acrylonitrile butadiene, butyl rubber, cellulose acetate, cellulose butyrate, epoxy resins, ethylene-vinyl acetate copolymers, modified ethylene-vinylacetate, vinyl acetate copolymers, ethylene-(meth)acrylic acid ionomers, vinylidene chloride copolymers, ethylene-(meth)acrylate copolymers, polyesters, natural rubber, neoprene, phenolic polymers, polyurethanes, polyvinyl acetate, polyvinyl alcohol, styrene butadiene rubber, casein, dextrin, starch, polysaccharides, copolymers of any two or more thereof and combinations of any two or more thereof; (b) a second polymer different than said first polymer, and preferably having a molecular weight different than said first polymer, and selected from the group consisting of ethylene-acrylic acid copolymers, oxidized polyethylenes, ethylene-vinyl acetate copolymers, oxidized ethylene-vinyl acetate copolymers, maleated polyolefins, homopolymers of polyethylene, homopolymers of polypropylene, and combinations of any two or more thereof; (c) a surfactant; and (d) water, where the amount of water is preferably sufficient to provide the composition with a solids content of greater than about 30% based on the total weight of the adhesion composition. In highly preferred embodiments the polymer components (a) and (b) are present in the composition in the form of solid particles having a D50 particle size of from about 10 nanometers (nm) to about 2000 nm, preferably about 10 to about 1000 nm; more preferably about 30 to about 600 nm; still more preferably about 50 to about 500 nm.

In particular embodiments, the first polymer is selected from the group consisting of acrylonitrile butadiene, butyl rubber, cellulose acetate, cellulose butyrate, epoxy resins, ethylene vinyl acetate, natural rubber, neoprene, phenolic polymers, polyurethanes, polyvinyl acetate, polyvinyl alcohol, styrene butadiene rubber, casein, dextrin, starch and combinations of two or more thereof.

In certain embodiments, the adhesion composition further comprises one or more additives (e) selected from the group consisting of natural and synthetic tackifiers, synthetic polymers such as polybutadienes, polyisobutylenes, polyisoprenes and styrene block copolymers, silicon-based MQ resins, anti-oxidants, stabilizers, fillers, wetting agents and defoaming agents. In specific embodiments the tackifier is a resin selected from the group consisting of rosin ester resin, rosin acid resin, synthetic hydrocarbon resin, synthetic terpenic resin and combinations of two or more thereof.

In certain embodiments, the solids content, and preferably the content of components (a) and (b), in the adhesion composition is greater than about 50%; in certain other embodiments, the solids content is about 30% to about 60%. Unless otherwise indicated herein, the reference to % used in respect to the adhesion composition refers to the percentage by weight of components a) through d) plus additive(s) e), if present, of the adhesion composition.

In certain embodiments, the first polymer is present in the adhesion composition in an amount of between about 50% and about 98.5% of the adhesion composition; a tackifier, if present, comprises from greater than about 0% and about 40%; and the second polymer comprised from about 2.5% to about 25%.

In certain embodiments of the present invention, the second polymer comprises, preferably consists essentially of, and more preferably consists of ethylene-acrylic acid copolymer.

In certain embodiments, the number average molecular weight of the first polymer of the adhesion composition is greater than about 500,000 Daltons. In some embodiments, the number average molecular weight of the first polymer is less than about 100,000 Daltons, preferably greater than about 25,000 Daltons and less than about 100,000 Daltons. In some embodiments, the number average molecular weight of the first polymer of the adhesion composition is at least about 50,000 Daltons. In other embodiments, the number average molecular weight of the first polymer is between about 1,000 and about 20,000 Daltons. For certain applications, the number average molecular weight of the adhesion composition is at least about 100,000 Daltons, or at least about 200,000 Daltons; for these applications a preferred range is about 250,000 to about 1,500,000 Daltons.

In one embodiment, and preferably those embodiments in which the adhesion composition comprises at least a portion of a pressure sensitive adhesive (PSA), the number average molecular weight of the first polymer of the adhesion composition is at least about 100,000 Daltons, preferably at least about 200,000 Daltons; and is preferably in the range of about 250,000 to about 1,500,000 Daltons. In one embodiment, an in particular in those embodiments in which the adhesion composition is included in or consist of a PSA, the number average molecular weight of the first polymer is greater than about 500,000 Daltons.

It is contemplated that the adhesion composition of the present invention may be used to enhance the adhesion characteristics of numerous materials and composition, and all such uses are within the broad scope of the present invention. However, it is believed that in many cases each of the following types of materials and compositions can benefit by containing, or in some cases consisting essentially of or consisting of, the adhesion compositions of the present invention, especially and preferably when such materials and compositions are water-based materials and compositions: heat seal adhesives; water-based inks; primer compositions; intercoat compositions; basecoat compositions; top coat compositions; clear coat compositions; sealer compositions; aqueous tie layers, overprint varnishes, rheological agents, water-based sealing materials for metal cans, and water-based sprayed can coatings. The foregoing and other materials are believed to achieve particular benefit to adhesion properties for those methods and applications in which the material is applied to or onto a low-energy substrate(s).

For certain heat seal adhesive compositions, the adhesion composition of the present invention comprises a first polymer component a) having a number average molecular weight greater than about 50,000 Daltons and a second polymer b) which preferably has a number average molecular weight of less than about 20,000 Daltons. For certain water-based ink compositions, the adhesion composition of the present invention comprises a first polymer component having a number average molecular weight greater than about 50,000 Daltons.

Certain embodiments are directed to methods of improving the cohesive and/or adhesive strength of certain materials and compositions, including particularly and preferably water-based materials and compositions, such as adhesives and the other materials and composition mentioned hereinabove, comprising adding an adhesion composition of the present invention to such a water-based material or compositions in amounts and under conditions effective to increase, and preferably substantially increase, at least one of cohesive and adhesive strength, and preferably both, relative to the same composition without the adhesive composition of the present invention.

In certain preferred embodiments, the present invention is directed to a method of improving the adhesion of a paint or ink, comprising adding adhesion composition of the present invention to a water-based paint or ink in amounts and under conditions such that adhesion to a low energy substrate surface is increased, and preferably adhesion to a high-energy substrate is increased as well. The paint in certain embodiments is preferably selected from the group consisting of a primer, an intercoat, a basecoat, a top coat, a clear coat, a sealer, an aqueous tie layer, and an overprint varnish. The ink is preferably selected in certain embodiments from the group consisting of a water-based packaging ink, a water-based printing ink and a water-based flexographic ink.

DETAILED DESCRIPTION OF THE INVENTION

Figure 1:
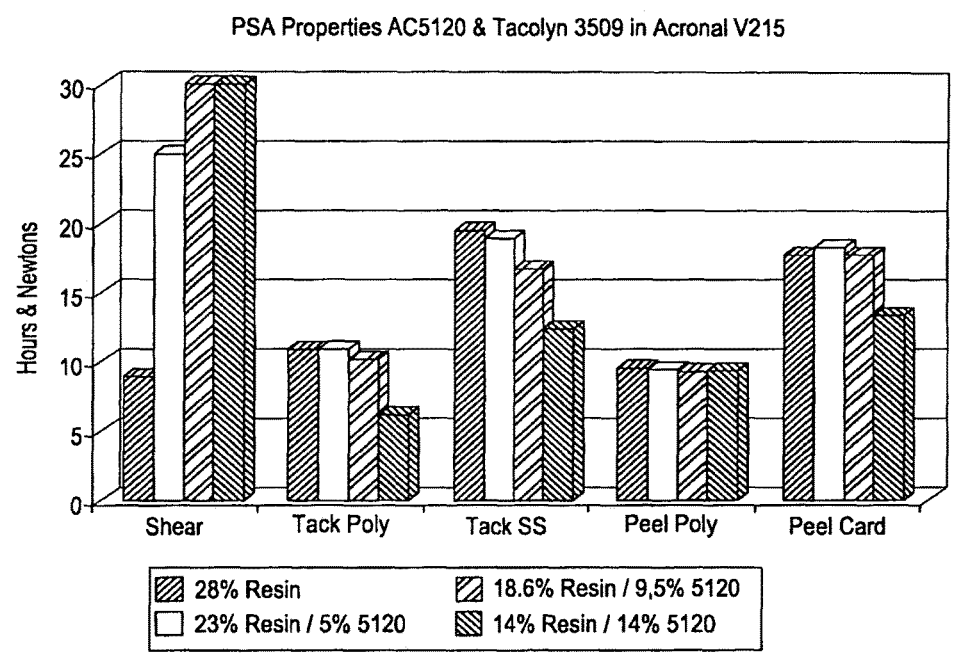
FIG. 1 shows a chart of the adhesion properties on different substrates of pressure-sensitive adhesives according to the procedures and materials described in Example 1.

Applicants have found that adhesion compositions of the invention, which preferably contain high solids content and low surfactant concentration, are capable of providing both improved cohesive and adhesive strength when used in a variety of water-based materials and compositions, including adhesives, coatings and inks. Thus, according to one aspect, the inventive adhesion compositions can be added as a component or adhesion promoting agent to another formulation, composition or material in order to provide desirable properties. The present invention thus includes a variety of materials and composition, preferably water-based materials and composition, including particularly water-based adhesives, coatings, inks and the like which preferably comprise the adhesion composition of the present invention (i.e., components (a) through (e) as described above) in amounts of from about 1% to about 25% by weight, preferably from about 2% to about 20% by weight, more preferably from about 5% to about 15% by weight, based on the weight of all the components in the water-based material or composition, including adhesive, coating or ink formulation.

In certain preferred embodiments the adhesion compositions are in the form of an emulsion, preferably where components (a) and (b) are emulsified and/or dispersed in the aqueous components. Applicants have found that one advantage of the adhesion composition in the form of an emulsion of the present invention (hereinafter sometimes referred to as "the adhesion emulsion") is the ability to achieve a high level of solids in the emulsion, preferably in an amount that is higher than, and more preferably substantially higher than the solids that has been previously commonly used, which provides one or more of, and preferably all of, the following advantages: 1) reduced cost in transportation (since compositions with less water are generally less expensive to ship); 2) faster drying, which occurs since there is less water required to evaporate; 3) higher film thicknesses; 4) higher substrate protection; 5) better barrier properties; and 6) less total number of coats required to achieve the desired coverage.

The preferred adhesion compositions of the present invention include solids with a particle size profile that has found to be advantageous. The particle size range that is preferred according to the present invention, together with and in view of the other aspects of the present invention, preferably has the advantage of providing improved mar, abrasion and burnish resistance, while preferably at the same time not causing a deterioration of coating gloss. Thus, the inventive adhesion compositions of the present invention, including adhesion emulsions, provide solids, and preferably first component (a) and second component (b) in the form of solid particulates, having a D50 particle size of from about 10 nm to about 2000 nm, preferably about 25 to about 1000 nm; more preferably about 50 to about 600 nm; still more preferably about 100 to about 500 nm. In some embodiments, the D50 particle size is greater than about 100 nm and less than about 1000 nm. In other embodiments, the D50 particle size is greater than about 200 nm and less than about 700 nm. In still other embodiments, the D50 particle size is greater than about 300 nm and less than about 600 nm. In certain preferred embodiments of the adhesion composition, including the emulsion composition, the solids thereof, and preferably first component (a) and second component (b) in the form of solid particulates, have a particle size distribution: with a D10 of about 10 nm or greater and a D90 of about 2000 nm or less; more preferably with a D10 of about 25 or greater and a D90 of about 1000 nm or less; even more preferably with a D10 of about 50 or greater and a D90 of about 600 nm or less; and still more preferably with a D10 of about 100 or greater and a D90 of about 500 nm or less. In some embodiments, the particle size distribution has a D10 of about 100 nm or greater and D90 of about 1000 nm or less. In other embodiments, the particle size distribution has a D10 of about 200 nm or greater and a D90 of about 700 nm or less. In still other embodiments, the particle size has a distribution with a D10 of about 300 nm or greater and a D90 of about 600 nm or less.

Applicants have surprisingly found that certain of the preferred embodiments of the present adhesion compositions are able to achieve effective adhesion and/or cohesion enhancement with an advantageously low concentration of surfactant. More specifically, the unexpected ability to use low surfactant concentrations according to the present invention, and particularly for the emulsion forms of the adhesion compositions, has the advantage of assisting in the formation of dried coatings and films that have excellent water resistance (lower tendency to absorb water from the environment after the coating has been dried) and/or enhanced film-forming ability. Accordingly, according to preferred aspects of the invention the adhesion compositions preferably contain surfactant amounts of from greater than about 0% to about 10%, more preferably from about 0.001% to about 5%, even more preferably from about 0.01% to about 1%, and still more preferably from about 0.05% to about 0.5%. In certain preferred embodiments, the amount of surfactant contained in the adhesion composition is less than about 5%, more preferably less than about 3%, and even more preferably less than about 1%. In certain preferred embodiments, the present adhesion compositions comprise surfactant in an amount less than about 0.5%, preferably less than about 0.1%, more preferably less than about 0.05%, and still more preferably less than about 0.01%.

Water-Based Adhesives

Preferred water-based synthetic polymers contemplated for use according to the present invention include: acrylic polymers, acrylonitrile butadiene, butyl rubber, cellulose acetate, cellulose butyrate, epoxy resins, ethylene vinyl acetate, natural rubber, neoprene, phenolic resins, polyurethanes, polyvinyl acetate, polyvinyl alcohol and styrene-butadiene rubber. Preferred water-based natural polymers contemplated for use according to the present invention include carbohydrate and protein bio-macromolecules such as casein, cellulosics, dextrin and starch.

For use with water-based adhesives, the present adhesion formulations preferably comprise (a) a first polymer as disclosed above; (b) a second polymer as disclosed above; (c) other functional components such as surfactants; (d) water; and (e) optionally other additives. The polymers, and potentially other functional components (including stabilizing agents), are preferably present as solid particles dispersed in water, preferably with a particle size distribution as described herein. Although it is possible that some percentage of the solid components (a) and (b) may be present as solutes in the water/aqueous solvent, this is generally not preferred. As noted above, for the use with water-based adhesives, the first polymer of the adhesion composition is preferably selected from the group consisting of acrylic polymers, acrylonitrile butadiene, butyl rubber, cellulose acetate, cellulose butyrate, epoxy resins, ethylene vinyl acetate, natural rubber, neoprene, phenolics, polyurethanes, polyvinyl acetate, polyvinyl alcohol, styrene-butadiene rubber, casein, and polysaccharides such as dextrin and starch. In such embodiments the second polymer is preferably selected from the group consisting of homopolymer polyethylene (PE) waxes, homopolymer polypropylene (PP) waxes, ethylene-propylene copolymer waxes, oxidized PE homopolymer waxes; EAA copolymer waxes, EVA copolymer waxes, oxidized EVA copolymer waxes, PE waxes grafted with maleic anhydride and PP waxes grafted with maleic anhydride.

Other functional components can optionally be included in the adhesion compositons of the present invention. In certain preferred embodiments, the other functional components are selected from the group consisting of natural tackifying resins, synthetic tackifying resins, polybutadiene, functionalized polybutadienes, polyisobutylene, functionalized polyisobutylene, polyisoprene, functionalized polyisoprene, styrene block copolymers with butadiene, styrene block copolymers with isoprene, styrene block copolymers with ethylene-butadiene rubber blocks, uncapped silicone MQ resins and capped silicone MQ resins, thickeners, wetting agents, antifoam agents, antioxidants, pigments, fillers and combinations of any two or more of these.

Applicants believe that the present adhesion compositions provide a difficult-to-achieve combination of advantages, including the following:

Viscosity: The adhesive viscosity is low enough to allow easy handling and processing, but not too low, so as to avoid excessive penetration into porous substrates, nor too high, such that the wetting of substrates is retarded.

Dry Content: The solids content of the adhesive can be raised as high as practically needed/possible to allow drying within an acceptable period of time for any given bond forming process.

Applicants believe that the ability of the present compositions to provide this combination of performance properties is an unexpected advantage due, at least in part, to the fact that the previously known synthetic adhesives exhibited issues that include limited load bearing capacity, tendency to creep under load, tendency to cold flow, a limited performance window with respect to temperature/humidity, and brittle fracture on mechanical shock. The present adhesion compositions are believed to be capable of overcoming these deficiencies.

One aspect of the present invention is directed to novel water-based dispersions and/or emulsions of one or more polymers and resins selected from homopolymer polyethylene waxes, homopolymer polypropylene waxes, ethylene-propylene copolymer waxes, oxidized polyethylene homopolymer waxes, ethylene acrylic acid copolymer waxes, ethylene vinyl acetate waxes, oxidized vinyl acetate copolymer waxes, polyethylene waxes grafted with maleic anhydride, polypropylene waxes grafted with maleic anhydride, natural and synthetic tackifying resins, polybutadiene and functionalized polybutadiene, polyisoprene and functionalized polyisoprenes, polyisobutylene and functionalized polyisobutylene, styrene block copolymers and silicon-based MQ resins.

The inclusion of the adhesion composition of the present invention into a water-based material or composition to act as an adhesion enhancing agent permits the formulation of higher performing products, which may be based on either synthetic or natural polymer chemistries. Thus these environmentally favorable products can be used in more demanding applications that have traditionally been served with less sustainable technologies, and in particular allows the expanded use of sustainable natural raw materials in adhesive formulations. Such adhesives are characterized by increased elastic and loss moduli as well as a capacity to maintain their physical characteristics over a broader temperature range, compared to the unmodified adhesive polymer.

The number average molecular weight of the first polymer in many preferred adhesion composition embodiments of the present invention is not less than about 100,000 Daltons. For many preferred heat seal adhesives according to the present invention, however, the first polymer of the adhesion composition has a number average molecular weight that is less than about 250,000 Daltons, and more preferably less than about 100,000 Daltons. In some preferred heat seal embodiments, the number average molecular weight of the first polymers present in the adhesion composition of the present invention is about 50,000 to about 100,000 Daltons.

It is contemplated that heat seal adhesives according to the present invention can be applied by a variety of coating techniques, including coating via gravure, slot die or extrusion processes. Low melting polymers, such as EVA, acrylic polymers, vinyl acetate copolymers, polyurethanes, polyesters and the like, are preferably used for heat seal adhesives, and the present adhesion composition is preferably added to those materials, preferably by mixing, to form a heat seal adhesive with enhanced adhesion and/or cohesion properties. A high performance heat seal adhesive for commercial usage should provide the properties of remaining non-tacky up to 130° F., having low heat activation temperature of 180-300° F., having hot green strength of at least about 1 psi to difficult-to-bond substrates, such as PP, PE, PET and aluminum foil.

In certain preferred method aspects of the present invention, high performance heat seal adhesives are prepared by incorporating emulsions of low molecular weight ethylene-acrylic copolymers, oxidized polyethylenes, ethylene-vinyl acetate copolymers, oxidized ethylene-vinyl acetate copolymers, maleated polyolefins, homopolymers of PE, PP waxes, and combinations of these in formulations which offer the benefits of anti-blocking, low activation temperature bonding and improved adhesion to difficult-to-bond substrates and high hot green strength.

In one preferred embodiment, the adhesion composition for use as, with or in addition to a heat seal adhesive composition comprises:

(a) a first polymer selected from the group consisting acrylic polymers, ethylene-vinyl acetate copolymers, modified EVA, vinyl acetate copolymers, polyurethanes, ethylene-(meth)acrylic acid ionomers, vinylidene chloride copolymers, ethylene-(meth)acrylate copolymers, polyesters and combinations of two or more thereof; and (b) a second polymer selected from the group consisting ethylene-acrylic acid copolymers, oxidized polyethylenes, ethylene-vinyl acetate copolymers, oxidized ethylene-vinyl acetate copolymers, maleated polyolefins, homopolymers of PE and PP, and combinations of two or more thereof;

(c) optionally, other additives, such as tackifiers, antiblocking agents, anti-oxidants, stabilizers, fillers, wetting agents;

(d) water, wherein said components (a) and (b) are present in said water in the form of an emulsion.

Boosting Water-Based Primer Adhesion

The addition of an adhesion composition of the present invention, preferably in the form of an emulsion of the present invention, can in many embodiments provide an improvement in adhesive qualities to aqueous primers, based on its aqueous compatibility and adhesion boosting characteristics. In many prior uses of aqueous primers, when such primers were applied over low-energy substrates difficulty was encountered in that the primer did not adequately wet that substrate and adher to it. The addition of a preferred adhesion composition, an even more preferably an adhesion emulsion of the invention, is capable of rectifying problems such as those and others.

Intercoat Adhesion Boosting; Two Different Coats of Ink or Paint

As for applying a primer to a substrate, once a primer is applied, especially an oil- or alkyd-based one, adhesion of the successive coats can be challenging. The addition of the inventive adhesion composition, and preferably an adhesion emulsion of the present invention, to the aqueous top coat boosts adhesion to the lower surface energy primer resulting in a better bond.

Aqueous Tie Layer

The adhesion composition, and preferably an adhesion emulsion of the present invention, with its adhesive qualities, can by itself, serve as a water-based tie layer between two similar or dissimilar substrates. It can also be added to another adhesive composition to provide an aqueous tie layer composition.

OPVs (Overprint Varnishes):

Typically high gloss clear coatings need good water, mar, burnish and abrasion resistance. Historically, OVPs have required aqueous waxes, typically high density oxidized ones in emulsion form in order to provide these properties to the typically acrylic-based OPV. The adhesion composition, and preferably an adhesion emulsion of the present invention, has a preferred particle size that is small enough to retain clarity and be gloss neutral, but provide a higher level of mar, burnish and abrasion resistance than a microemulsion. Further, the addition of the present adhesion composition/emulsion does not detract from gloss or clarity as micronized waxes tend to do.

Water-Based Rheological Agent

Compositions of the invention where the first polymer or copolymer has a number average molecular weight of less than about 20,000 Daltons, preferably less than about 12,000 Daltons, show efficacy when used as water-based and/or water reducible rheological control agents and/or as an additive in other compositions that are used or applied as water-based and/or water reducible rheological control agents. In some preferred embodiments of this type, the first polymer of the present adhesion composition has a number average molecular weight of less than about 1,000 Daltons. Advantages of the adhesion composition of the present invention, and preferably such a composition that includes polyethylene-based polymer, as rheological control agent or an additive thereto, compared to what is currently in the market place are many fold, including 1) not prone to microbial attack; 2) not pH sensitive; 3) not shear sensitive; 4) provides ease of incorporation (liquid to liquid), with no exfoliation or activating solvents necessary; and 5) is thixotropic providing the best rheological profile for coatings and shows efficacy in water-based and/or water reducible rheological control. In some embodiments the first polymer is EAA or a metal ionomer thereof.

Water-Based Sealing Compound of Metal can Ends or Lids to the Body of Metal Cans; O-Ring Seal; End-Sealing Compounds The adhesion composition, and preferably an adhesion emulsion of the present invention, provides benefits as a water-based sealing compound and as component in or additive to other water-based formulations of sealing material (sometimes referred to as a "sealing compound") of can ends (lids) to the body of cans. According to preferred method aspects of the invention, the sealing material is enhanced by use of the present adhesion composition, preferably the adhesion emulsion, and is then lined in the annular groove inside the perimeter of the can lid, and forced-air-dried to a "casket" similar to an O-ring configuration. Preferably the can lid is subsequently double-seamed to the flanges of the can body to seal the can. Preferred water-based end seaming formulations are primarily comprised of aqueous latex styrene-butadiene rubber (SBR), fillers, tackifiers, dispersing agents and rheology modifying agents. In one embodiment of the water-based sealing formulations, the adhesion composition comprises as the first polymer a) low number average molecular weight (below 10,000 Daltons) acrylic modified polyethylene copolymers (such as EAA), and the composition is preferably in the form of a water-based high solids (30-60%, e.g. 55% solids) emulsion. In such embodiments, the present adhesion compositions are capable of providing compatibility and tackifying benefits. Without being bound by theory, it is believed that this advantage is due, at least in part, to the dual aspects of the formulations, i.e., polar (e.g., acrylic) and non-polar (e.g., polyethylene features). The inventive water-based sealing formulations also provide improved adhesion of the formulations to the metal lids. Once again, without being bound by theory, this advantage is believed to be due, at least in part, to the presence of carboxyl functionality which bonds to metal. Further, the inventive water-based sealing formulations provide faster drying times of the formulation due to the high solids concentration, requiring less time for water removal (low water content). All of these factors combine to increase performance and line speed in can end sealing manufacturing operations.

Water-Based Sprayed can Coatings for Two-Piece Cans

Emulsions of the present invention can also provide benefits as water-based spray coating and as a component of or additive to such materials, which are coatings used in the interior of beer, beverage or food 2-piece cans. Its carboxyl group functionality can provide reactive sites to further cross-link amine or hydroxyl functional groups available from cross-linkers from the binder components, resulting in in situ polymerization under thermoset conditions. In one embodiment, the EAA chemistry of the inventive composition comprises low molecular weight (LMW) EAA polymers. As used herein, the term "low molecular weight" means a number average molecular weight of less than 10,000 Daltons, unless specifically indicated otherwise herein. The polymerization encounters minimal steric hindrance so that the EAA polymer is readily incorporated into the cross-linked polymer network. Any remaining unreacted free carboxyl groups provide added adhesion to the metal can. The inert polyethylene backbone of the EAA provides polymer flexibility, reducing internal polymer stress, which allows for improved flexibility. These traits also allow for downstream fabrication during flanging of the 2-piece body can. Spayability is assisted by the rheological profile of the inventive composition, allowing for shear thinning during spraying. The inventive compositions also allows for thixotropic recovery of the applied wet film before drying and setting under heat. The high solids feature of the preferred emulsion (30-60%) aids spraying of the formulation to achieve higher film weights per can, when desired.

Water-Based Flexographic Inks Formulated to be Printed onto Low-Energy Substrates Since flexographic inks are applied by small-pore anilox rollers as thin films, advantage can be achieved by combining the present adhesive compositions with such inks, especially since the cohesive properties of such materials is considered important. The inventive adhesion composition, preferably the adhesion emulsion, is preferably used in such embodiments a component in water-based flexographic formulations, and specifically provides unique benefits for printing on plastic, film and foil substrates. Water-based flexographic inks are widely used on cellulosic and corrugated substrates and most flexographic inks are easily absorbed by these substrates. Non-absorbing substrates, however, require reformulated water-based flexographic inks that have lower surface tension than the substrates that are printed, that wet low-energy substrates readily, and that adhere to the substrate upon curing (hot air). The inventive compositions address these needs and enable the formulation of high solids, low surface energy, water-based inks with desirable rheology for printing low energy substrates.

Although not wishing to be bound by any particular theory, it is believed that improved adhesion of the inventive compositions is related to the presence of carboxyl functionality, which gives much higher molecular weight polymerizations upon curing. This boosts adhesion to another substrate, particularly for difficult substrates having a low-energy surface. Further, the free carboxyl functionality provides potential cross-linking sites, which is of importance to water-based adhesives, inks and coatings.

In certain preferred embodiments the adhesion compositions contain an acrylate polymer and a tackifier. Acrylate polymers are commonly used to improve cohesion of the pressure-sensitive adhesive and resistance to shear. Tackifiers, on the other hand, are commonly used to improve adhesion. The term tackifier usually refers to a low molecular weight resin with a number average molecular weight in the range between about 270 and about 1400 Daltons. Most commercially available tackifiers have a number average molecular weight that is in the range between about 800 and about 1200 Daltons. Molecules with number average molecular weights of greater than about 2000 Daltons are normally referred to as polymers. Commercially available tackifiers are commonly based on rosin esters, but might also be based on rosin acids, dimerised rosin acids and certain types of synthetic resins such as terpenic resins and $C_9/C_5$ hydrocarbon resins. Tackifiers improve peel adhesion to "difficult-to-bond substrates," such as polyethylene, and they also improve quick stick (tack) properties to low-energy and high-energy surfaces. There are, however, a number of drawbacks to using tackifier resins. Tackifier resins need to be dispersed with a much higher concentration of surfactants than polymer systems. Excess surfactant absorbs moisture, which can negatively impact the convertibility of the pressure-sensitive adhesive. Moreover, resins are super cooled liquids, which exhibit a tendency to flow. This leads to sticky edges and gumming of knives. Additionally, the low molecular weight of resins allows them to migrate into paper substrates, leading to loss of adhesion. This effect is augmented by heat and humidity.

It has now been found that adhesives can be manufactured that contain less rosin-based tackifier than many commercially available adhesives and are therefore less prone to the above-mentioned problems, by using the adhesion composition, and particularly the adhesion emulsion, of the present invention. Additionally, the adhesives which incorporate the adhesion composition of the present invention have overall better cohesion and shear resistance, and, at the same time, similar or better adhesion to certain difficult substrates, particularly after aging, than adhesives made without the present compositions but containing primarily acrylate polymer and rosin ester.

The present invention also provides a water-based composition that is adapted for adhesion to low-energy substrates. This composition comprises a first polymer that is selected from the group consisting of acrylic polymers, acrylonitrile butadiene, butyl rubber, cellulose acetate, cellulose butyrate, epoxy resins, ethylene vinyl acetate, natural rubber, neoprene, phenolic polymers, polyurethanes, polyvinyl acetate, polyvinyl alcohol, styrene butadiene rubber, casein, dextrin, starch, copolymers of two or more thereof and combinations of two or more hereof. In one embodiment, the composition of the present invention also comprises a tackifier resin selected from the group consisting of rosin ester resin, rosin acid resin, synthetic hydrocarbon resin, synthetic terpenic resin and combinations of two or more thereof. In one embodiment, the composition of the present invention also comprises a second polymer selected from the group consisting of ethylene-acrylic acid copolymer, oxidized polyethylene, oxidized ethylene-vinyl acetate copolymer, maleated polyolefin and combinations of two or more thereof.

Acrylate polymers (polymers composed of acrylic acid or acrylic acid derivates) and copolymers (co-polymers composed of acrylic acid or acrylic acid derivates) are conventionally used in the art of pressure-sensitive adhesives and the types of acrylate polymers and copolymers that can be used in the present invention are not particularly limited. However, alkyl acrylates and alkyl methacrylates, which in combination may be designated as "alkyl (meth)acrylate," are preferably used as the major monomer component in the acrylate polymers and copolymers of the present invention. These alkyl (meth)acrylates are represented by the following general formula:

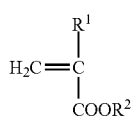

wherein R¹ represents a hydrogen atom or a methyl group and R² represents an alkyl group. Examples of the alkyl group for R² include linear or branched alkyl groups having 1 to 18 carbon atoms, such as a methyl group, an ethyl group, a propyl group, an isopropyl group, a butyl group, an isobutyl group, an s-butyl group, a t-butyl group, a pentyl group, an isoamyl group, a neopentyl group, a hexyl group, a heptyl group, an octyl group, an isooctyl group, a 2-ethylhexyl group, a nonyl group, an isononyl group, a decyl group, an isodecyl group, an undecyl group, a dodecyl (lauryl) group, a tridecyl group, a tetradecyl group, a pentadecyl group, a hexadecyl group, a heptadecyl group, and an octadecyl (stearyl) group.

Examples of the alkyl(meth)acrylates include methyl (meth)acrylate, butyl(meth)acrylate, isobutyl(meth)acrylate, s-butyl(meth)acrylate, t-butyl(meth)acrylate, pentyl(meth) acrylate, isoamyl(meth)acrylate, neopentyl(meth)acrylate, hexyl(meth)acrylate, heptyl(meth)acrylate, 2-ethylhexyl (meth)acrylate, octyl(meth)acrylate, isooctyl(meth)acrylate, nonyl(meth)acrylate, isononyl(meth)acrylate, decyl(meth) acrylate, isodecyl(meth)acrylate, undecyl(meth)acrylate, dodecyl(meth)acrylate, and the like.

In addition to alkyl(meth)acrylate as the major constituting monomer component, another minor monomer component that is copolymerizable with the alkyl(meth)acrylate can also be used. The amount of the alkyl(meth)acrylate with respect to the total amount of monomers constituting the acrylate polymer or copolymer is preferably 50% by weight or more. More than one type of alkyl(meth)acrylate can be used in the same acrylate polymer and copolymer.

The copolymerizable monomer component can be used for introducing a crosslinking site into the acrylate polymer or for enhancing an aggregating ability of the acrylate polymer. One type or several different types of monomers can be used for copolymerization.

In order to introduce a crosslinking site into the acrylate polymer, monomers containing a certain functional group can be used as the copolymerizable monomer component. The use of the functional group-containing monomer component can enhance the adhesive force of the polymer. Such a functional group-containing monomer component is not particularly limited. It is a monomer component copolymerizable with the alkyl (meth)acrylate, having a functional group which becomes a crosslinking site. Non-limiting examples of such monomers include carboxyl group-containing monomers such as (meth)acrylic acid, itaconic acid, crotonic acid, maleic acid, fumaric acid, and isocrotonic acid or acid anhydrides thereof such as maleic anhydride and itaconic anhydride; hydroxyl group-containing monomers, e.g., hydrokyalkyl(meth)acrylates such as 2-hydroxyethyl (meth)acrylate, 2-hydroxypropyl(meth)acrylate, and 2-hydroxybutyl(meth)acrylate and also vinyl alcohol and allyl alcohol; amide-based monomers such as (meth)acrylamide, N,N-dimethyl(meth)acrylamide, N-butyl(meth)acrylamide, N-methylol(meth)acrylamide, N-methylolpropane(meth) acrylamide, N-methoxymethyl(meth)acrylamide, and N-butoxymethyl(meth)acrylamide; amino group-containing monomers such as aminoethyl(meth)acrylate, N,N-dimethylaminoethyl(meth)acrylate, and t-butylaminoethyl(meth) acrylate; epoxy group-containing monomers such as glycidyl(meth)acrylate and methylglycidyl(meth)acrylate; cyano-containing monomers such as acrylonitrile and methacrylonitrile; monomers having a nitrogen atom-containing ring, such as N-vinyl-2-pyrrolidone, N-methylvinylpyrrolidone, N-vinylpyridine, N-vinylpiperidone, N-vinylpyrimidine, N-vinylpiperazine, N-vinylpyrazine, N-vinylpyrrole, N-vinylimidazole, N-vinyloxazole, N-vinylmorpholine, N-vinylcaprolactam, and N-(meth)acryloylmorpholine; and the like.

In order to enhance the aggregating ability of the acrylate polymer, other copolymerizable monomers can be used. Non-limiting examples of the other copolymerizable monomer components include vinyl ester-based monomers such as vinyl acetate and vinyl propionate; styrene-based monomers such as styrene, substituted styrenes (such as α-methylstyrene and vinyltoluene); non-aromatic ring-containing (meth)acrylate esters such as cycloalkyl(meth)acrylates (such as cyclohexyl(meth)acrylate, cyclopentyl di(meth) acrylate, bornyl(meth)acrylate and isobornyl(meth)acrylate]; aromatic ring-containing (meth)acrylate esters such as aryl(meth)acrylates [e.g. phenyl (meth)acrylate], aryloxyalkyl(meth)acrylate (e.g. phenoxyethyl(meth)acrylate), and arylalkyl(meth)acrylates (e.g. benzyl(meth)acrylate); olefinic monomers such as ethylene, propylene, isoprene, butadiene, isobutylene, vinyl chloride and vinylidene chloride; isocyanate group-containing monomers, such as 2-(meth)acryloyloxyethyl isocyanate; alkoxy group-containing monomers such as methoxyethyl(meth)acrylate and ethoxyethyl(meth)acrylate; vinyl ether-based monomers such as methyl vinyl ether and ethyl vinyl ether; and polyfunctional monomers such as 1,6-hexanediol di(meth) acrylate, ethylene glycol di(meth)acrylate, diethylene glycol di(meth)acrylate, triethylene glycol di(meth)acrylate, tetraethylene glycol di(meth)acrylate, polyethylene glycol di(meth)acrylate, propylene glycol di(meth)acrylate, polypropylene glycol di(meth)acrylate, neopentyl glycol di(meth)acrylate, pentaerythritol di(meth)acrylate, trimethylolpropane tri(meth)acrylate, pentaerythritol tri(meth)acrylate, dipentaerythritol hexa(meth)acrylate, glycerin di(meth)acrylate, epoxy acrylates, polyester acrylates, urethane acrylates, divinylbenzene, butyl di(meth)acrylate, hexyl di(meth)acrylate; and combinations of any two or more of these and like monomers.

In some embodiments of the present invention, the acrylate polymer or copolymer includes 2-ethylhexyl acrylate and/or butyl acrylate as the major monomer component and methyl methacrylate, vinyl acetate and/or styrene as the minor monomer component.

Processes for polymerizing acrylate polymers and acrylate copolymers are generally known in the art. Non-limiting examples of such processes are emulsion (co)polymerization, solution (co)polymerization, suspension (co)polymerization, all-components-charging processes (at once polymerization processes), and monomer-dropping processes (continuously dropping process, portion-wise dropping process).

The polymerization initiator to be used is selected from those generally known in the art, according to the type of polymerization process involved. Non-limiting examples of polymerization initiators include azo polymerization initiators such as 2,2'-azobisisobutyronitrile, 2,2'-azobis(2-methylpropion-amidine)disulfate, 2,2'-azobis(2-amidinopropane) dihydrochloride, 2,2'-azobis[2-(5-methyl-2-imidazolin-2-yl) propane]dihydrochloride, 2,2'-azobis(N,N'-dimethyleneisobutylamidine), 2,2'-azobis(4-methoxy-2,4-dimethylvaleronitrile), 2,2'-azobis(2,4-dimethylvaleronitrile), 2,2'-azobis(2-methylbutyronitrile), 1,1'-azobis(cyclohexane-1-carbonitrile), 2,2'-azobis(2,4,4-trimethylpentane), dimethyl-2,2'-azobis(2-methyl-propionate), and 2,2'-azobis[N-(2-carboxyethyl)-2-methylpropionamidine]hydrate; persulfate salt-based polymerization initiators such as potassium persulfate and ammonium persulfate; peroxide-based polymerization initiators such as benzoyl peroxide, t-butyl hydroperoxide, di-t-butyl peroxide, t-butyl peroxybenzoate, dicumyl peroxide, 1,1-bis(t-butylperoxy)-3,3,5-trimethylcyclohexane, 1,1-bis(t-butylperoxy)cyclododecane, and hydrogen peroxide; substituted ethane-based polymerization initiators such as phenyl-substituted ethane; aromatic carbonyl compounds; and redox system initiators. Polymerization initiators may be used alone or in combination of two or more.

The amount of the polymerization initiator is typical of those commonly used in the art, and can be, for example, selected from the range of about 0.01 to 1 part by weight, preferably 0.02 to 0.5 part by weight, relative to 100 parts by weight of the total monomer components to be polymerized.

The polymerization temperature is selected according to the type of monomer, the type of initiator, and the like, as commonly known in the art, and can be, for example, in the range between 20° C. and 100° C.

The acrylate polymer and acrylate copolymer compositions may be dispersed or emulsified in a medium, for example water. Any suitable emulsifier can be used for that purpose. Non-limiting examples of anionic emulsifiers include alkyl sulfate salt-type anionic emulsifiers such as sodium lauryl sulfate, ammonium lauryl sulfate, and potassium lauryl sulfate; polyoxyethylene alkyl ether sulfate salt-type anionic emulsifiers such as sodium polyoxyethylene lauryl ether sulfate; polyoxyethylene alkylphenyl ether sulfate salt-type anionic emulsifiers such as ammonium polyoxyethylene laurylphenyl ether sulfate and sodium polyoxyethylene laurylphenyl ether sulfate; sulfonate salt-type anionic emulsifiers such as sodium dodecylbenzenesulfonate; sulfosuccinate-type anionic emulsifiers such as disodium lauryl sulfosuccinate and disodium lauryl polyoxy-ethylenesulfosuccinate; and the like. Moreover, non-limiting examples of nonionic emulsifiers include polyoxyethylene alkyl ether-type nonionic emulsifiers such as polyoxyethylene lauryl ether; polyoxyethylene alkylphenyl ether-type nonionic emulsifiers such as polyoxyethylene laurylphenyl ether; nonionic emulsifiers such as polyoxyethylene fatty acid esters, polyoxyethylene-polyoxypropylene block polymers; combinations of any two or more of these and the like monomers.

The amount of the emulsifier to be used is not particularly limited as far as it is an amount capable of preparing the acrylate polymer or acrylate copolymer in an emulsion form. For example, the amount can be selected from the range of about 0.3 to 10 parts by weight, preferably about 0.5 to 5 parts by weight relative to 100 parts by weight of the acrylate polymer or acrylate copolymer, or monomer components thereof.

An acrylate copolymer for use in the present adhesion compositions can be obtained from BASF Corporation, Charlotte, N.C., USA, under the trade name ACRONAL® V215. ACRONAL® V215 has the following specification: the solids content is 68 to 70%; the pH value is 3.5 to 6.0; the viscosity at 23° C. (Brookfield RVT, spindle #3, at 50 rpm) is 400 to 2000 cps; the density is about 8.4 lb/gal; the viscosity at 23° C. (shear rate 100 sec-1) is 200 to 1000 cps; the mean particle size is about 0.6 μm; the dispersion type is anionic; and the glass transition temperature (DSC) is about 43° C.

Another acrylate copolymer useful according to the present compositions is sold by Organik Kimya, Turkey, under the name ORGAL AX1260.

Tackifiers are conventionally used in the art of pressure-sensitive adhesives and the type of tackifier that can be used in the present invention is not particularly limited. Non-limiting examples of possibly suitable tackifiers include rosin-based tackifying resins, terpene-based tackifying resins, hydrocarbon-based tackifying resins, epoxy-based tackifying resins, polyamide-based tackifying resins, elastomer-based tackifying resins, phenol-based tackifying resins, ketone-based tackifying resins, and the like. The tackifying resin can be used solely or in combination of two or more thereof.

Rosin is a solid form of resin obtained primarily, but not exclusively, from conifers (rosin obtained from this source is sometimes called gum rosin). Other sources of rosin include rosin obtained from the distillation of crude tall oil (called tall oil rosin). Rosin may also be obtained from aged pine stumps (typically called wood rosin). Rosin primarily consists of different rosin acids, especially abietic acid, neoabietic acid, palustric acid, levopimaric acid, dehydroabietic acid, pimaric acid, sandaracopimaric acid and isopimaric acid.

Rosin-based tackifier resins can include unmodified rosins (raw rosins) such as gum rosins, wood rosins, and tall oil rosins and rosins modified by hydrogenation, disproportionation, polymerization or other processes. Non-limiting examples of rosin derivatives include rosin esters obtained by esterifying unmodified rosins and rosin esters obtained by esterifying modified rosins, including, for example, hydrogenated rosins, disproportionated rosins, polymerized rosins, and the like; unsaturated fatty acid-modified rosins obtained by modifying unmodified rosins or modified rosins (hydrogenated rosins, disproportionated rosins, polymerized rosins, and the like) with unsaturated fatty acids; unsaturated fatty acid-modified rosin esters obtained by modifying rosin esters with unsaturated fatty acids; rosin alcohols obtained by reducing the carboxyl group in unmodified rosins, modified rosins (hydrogenated rosins, disproportionated rosins, polymerized rosins, and the like), unsaturated fatty acid-modified rosins, or unsaturated fatty acid-modified rosin esters; metal salts of rosins (in particular, rosin esters) including unmodified rosins, modified rosins, and various rosin derivatives; and the like. In addition, there can be used rosin phenol resins obtained by adding phenol to rosins (unmodified rosins, modified rosins, and various rosin derivatives, and the like) in the presence of an acid catalyst, followed by thermal polymerization. Rosin-based tackifying resins, and their manufacture, are well known to those skilled in the art. Therefore, these resins and their manufacture are not described herein in greater detail.

Rosin acids and rosin acid-based resins are known to the person of skill in the art and commercially available from many sources, for example DRT (France), Euro-Yser (Portugal), Harima Chemicals, Inc. (Japan), and Eastman Chemical Company (USA).

Rosin ester resins are commercially available, for example, from Eastman Chemical Company, Kingsport, Tenn., USA, under the trade name TACOLYN™ 3509. TACOLYN™ 3509 resin dispersion is an anionic, aqueous, 55% solids, solvent-free dispersion of a stabilized rosin ester with low surface tension. TACOLYN™ 3509 resin dispersion has the following specification: the average particle size is typically 200 nm; the softening point (Hercules drop method) is 68-78° C.; the total solids content is 54-56%; the viscosity, Brookfield LVTD, 60 rpm, at 25° C. is 100-500 mPa·s; and the density is typically 1.05 g/mL.

Rosin dispersion is commercially available, for example, from Arizona Chemical, FL, USA, under the trade name AQUATAC™ XR 4343, which has the following specification: the ring and ball softening point is about 80° C.; the solids content is about 60%; the pH is typically 8.5; and the viscosity is typically between 500 and 700 cps at Brookfield #3 spindle at 50 rpm at 21° C.

Synthetic hydrocarbon resins are the products of the polymerization of the C9 or C9/C5 by-product fractions derived from the cracking or chemical treatment of petroleum. These types of resins are known in the art and commercially available from many sources (e.g., Eastman Chemical Company, Kingsport, Tenn., USA, under the trade name TACOLYN™ 1070).

Synthetic terpenic resins are dispersions of terpene and phenol, or terpene and styrene or styrene-derivatives. These types of resins are known in the art and commercially available from many sources (e.g., DRT, France, and Arizona Chemical, FL, USA).

The tackifier may have a form constituted by the tackifying resin alone or may be dissolved or dispersed in a medium-like water. The water-dispersion type tackifier can be prepared by dissolving or melting the tackifying resin and subsequently dispersing it in water. An emulsifier can be employed for the dispersion of the tackifying resin in water. Any suitable type of emulsifier may be used. Non-limiting examples of anionic emulsifiers include alkyl sulfate salt-type anionic emulsifiers such as sodium lauryl sulfate, ammonium lauryl sulfate, and potassium lauryl sulfate; polyoxyethylene alkyl ether sulfate salt-type anionic emulsifiers such as sodium polyoxyethylene lauryl ether sulfate; polyoxyethylene alkylphenyl ether sulfate salt-type anionic emulsifiers such as ammonium polyoxyethylene laurylphenyl ether sulfate and sodium polyoxyethylene laurylphenyl ether sulfate; sulfonate salt-type anionic emulsifiers such as sodium dodecylbenzenesulfonate; sulfosuccinate-type anionic emulsifiers such as disodium lauryl sulfosuccinate and disodium lauryl polyoxyethylenesulfosuccinate; and the like. Non-limiting examples of the nonionic emulsifiers include polyoxyethylene alkyl ether-type nonionic emulsifiers such as polyoxyethylene lauryl ether; polyoxyethylene alkylphenyl ether-type nonionic emulsifiers such as polyoxyethylene laurylphenyl ether; nonionic emulsifiers such as polyoxyethylene fatty acid esters, polyoxyethylene-polyoxypropylene block polymers; combinations of any two or more of these and the like monomers. Surfactants may also be used for the dispersion of the tackifying resin in water or other medium.

The amount of the emulsifier to be used is not particularly limited as far as it is in an amount capable of preparing the tackifying resin in an emulsion form. For example, the amount can be selected from the range of about 0.2 to 10% by weight, preferably from 0.5 to 5% by weight, based on the total amount of the tackifying resin (solid matter).

The emulsifier used for the preparation of the water-dispersion type tackifier can be the same as or different from the emulsifier used for the preparation of the water-dispersion type acrylate polymer or acrylate copolymer mentioned above.

The ratio by weight between the acrylate polymer and the tackifier resin in the pressure-sensitive adhesive is not particularly limited and can be selected according to the degree of adhesiveness that the pressure-sensitive adhesive is desired to have. In some embodiments of the present invention, the ratio by dry weight between the acrylate polymer (or acrylate copolymer) and the tackifier resin is between about 9:1 and about 8:1. In other embodiments, the ratio is between about 8:1 and about 7:1 between about 7:1 and about 6:1, between about 6:1 and about 5:1, between about 5:1 and about 4:1, between about 4:1 and about 3:1, between about 3:1 and about 2:1, between about 2:1 and about 1:1, between about 1:1 and about 1:2, and between about 1:2 and about 1:3.

The second polymer of the present invention is selected from the group consisting of ethylene-acrylic acid copolymer, oxidized polyethylene, oxidized ethylene-vinyl acetate copolymer, maleated polyolefin and combinations of two or more thereof. Ethylene-acrylic acid copolymers are well known to those skilled in the art, as is their manufacture. These copolymers are used for numerous applications. For example, these copolymers are used as additives in adhesives, coatings and inks. Ethylene-acrylic acid copolymers are made by polymerization of ethylene and acrylic acid monomers, usually using a free radical initiator. The acrylic acid content of the copolymer contributes to the copolymer's polarity and adhesion and lowers its crystallinity. As the content of the acrylic acid monomer subunits in the polymer increases, the crystallinity of ethylene-acrylic acid copolymers decreases. The amount of acrylic acid monomer subunits in the copolymers, or the copolymers' acid number, is determined by method ASTM D-1386. Polymers with high acid number contain high content of acrylic acid monomers. Commercial grades of ethylene-acrylic acid copolymers are available in acid numbers from about 40 to 200 mgKOH/g. The acidic group in the ethylene-acrylic acid copolymers provides reactive sites for the manufacture of water-based emulsions. The number average molecular weight (Mn) of ethylene-acrylic acid copolymers commonly ranges from 1,500 to 3,000 and their weight average molecular weight (Mw) commonly ranges from 2,000 to 6,000. The molecular ethylene-acrylic acid copolymers is determined by Gel Permeation Chromatography (GPC). The density of the polymers commonly ranges from 0.90-1.00 g./cc as determined by method ASTM D-1505. The Mettler Drop point of the polymers commonly ranges from 70° C.-110° C. as determined by method ASTM D-3954. The viscosity at 140° C. of ethylene-acrylic acid copolymers commonly ranges from 200-1,000 cps as determined by a Brookfield rotational viscometer. The hardness of the ethylene-acrylic acid copolymers at 25° C. commonly ranges from 1-50 dmm as determined by method ASTM D-5.

Ethylene-acrylic acid copolymer is commercially available, for example, from Honeywell International Inc., as A-C® 5120. A-C® 5120 has the following specification: the acid number is 112 to 130 mgKOH/g; the penetration hardness value at 25° C. is lower than than 15 dmm (typically 8 dmm); the viscosity at 140° C. (Brookfield) is 600 cps; the drop point (Mettler) is 92° C.; and the density is 0.93 g/cc.

Oxidized ethylene-vinyl acetate copolymers are well known to those skilled in the art, as is their manufacture. Oxidized ethylene-vinyl acetate copolymers contain polar groups, such as carboxylic acid, hydroxyl, ketone and ester groups, in the polymer molecule. The polymers are made by oxidation of ethylene-vinyl acetate copolymers with oxygen (typically provided in air) at elevated temperatures. Oxidized ethylene-vinyl acetate copolymers are semi-crystalline materials, which contain a variety of polar groups besides carboxylic acid, all of which contribute to the adhesion and water compatibility of the oxidized ethylene-vinyl acetate copolymer. These copolymers are used for numerous applications. For example, these copolymers are used as additives in adhesives, coatings and inks. The acid content in oxidized ethylene-vinyl acetate copolymers, or the copolymers' acid number, is determined by method ASTM D-1386. Commercial grades of oxidized ethylene-vinyl acetate copolymers are commonly available in acid numbers from about 8-30 mgKOH/g. The acidic groups in the copolymers provides reactive sites for making water-based emulsions. The number average molecular weight (Mn) of oxidized polyethylenes commonly ranges from 1,500 to 4,000 and their weight average molecular weight (Mw) commonly ranges from 4,000 to 15,000. For both Mn and Mw, the molecular weight of oxidized ethylene-vinyl acetate copolymers is determined by Gel Permeation Chromatography (GPC). The density of the copolymers commonly ranges from 0.85-1.00 g/cc as determined by method ASTM D-1505. The Mettler drop point of the copolymers commonly ranges from 75° C.-110° C. as determined by method ASTM D-3954. The viscosity at 140° C. of the copolymers ranges from 250 to 1,500 cps as determined by a Brookfield rotational viscometer. The hardness of the polymers commonly ranges from 3-80 dmm as determined by method ASTM D-5.

Oxidized ethylene-vinyl acetate copolymer is commercially available from, for example, Honeywell International Inc. under the trade name A-C® 645P. A-C® 645P has the following specification: the acid number is 12 to 16 mgKOH/g; the hardness at 25° C. is 4 to 7 dmm; the viscosity at 140° C. (Brookfield) is 375 cps; the drop point (Mettler) is 99° C.; and the density is 0.94 g/cc.

Oxidized polyethylenes are well known to those skilled in the art, as is their manufacture. Oxidized polyethylenes contain polar groups, such as carboxylic acid, ketone, hydroxyl and ester groups, which contribute to adhesion and water compatibility of the polymer. The oxidized polyethylenes are made by oxidation of polyethylenes (low density, medium density and high density types) with oxygen (typically provided as air) at elevated temperatures. Oxidized polyethylenes are semi-crystalline materials. These polymers are used for numerous applications. For example, these copolymers are used as additives in adhesives, coatings and inks. The acid content in these polymers, or the polymers' acid number, is determined by method ASTM D-1386 method. Commercial grades of oxidized polyethylenes are commonly available in acid numbers from about 10 to 45 mgKOH/g. The acidic groups in the polymers provides reactive sites for making water-based emulsions. The number average molecular weight (Mn) of oxidized polyethylenes commonly ranges from 800 to 6,000 and their weight average molecular weight (Mw) commonly ranges from 1,500 to 20,000. The molecular weight (for both Mn and Mw) of oxidized polyethylenes is determined by Gel Permeation Chromatography (GPC). The density of the polymers commonly ranges from 0.85 to 1.00 g/cc as determined by method ASTM D-1505. The Mettler drop point of the polymers ranges from 85° C. to 145° C. as determined by method ASTM D-3954. The viscosity at 140° C. of the polymers commonly ranges from 35 to 100,000 cps as determined by a Brookfield rotational viscometer. The hardness of the polymers commonly ranges from less than 0.5 to 100 dmm as determined by method ASTM D-5.

Oxidized polyethylene polymer is commercially available from, for example, Honeywell International Inc. under the trade name A-C® 655. A-C® 655 has the following specification: the acid number is 14 to 17 mgKOH/g; the hardness at 25° C. is 2 to 3 dmm; the viscosity at 140° C. (Brookfield) is 210 cps; the drop point (Mettler) is 107° C.; and the density is 0.93 g/cc. Another oxidized polyethylene polymer commercially available from Honeywell International Inc. is oxidized polyethylene sold under the trade name A-C® 656. A-C® 656 has the following specification: the hardness at 25° C. is 8 to 12 dmm; the drop point (Mettler) is 98° C.; the density is 0.92 g/cc; the viscosity at 140° C. (Brookfield) is 185 cps; and the acid number is 14 to 17 mgKOH/g.

Maleated polyolefins are well known to those skilled in the art, as is their manufacture. Maleated polyolefins contain polar groups in the polymer molecule. Maleated polyolefins can be made by grafting maleic anhydride to polyolefins with a peroxide. Maleated polyolefins are semi-crystalline materials. They are used for numerous applications. For example, these polymers are used as additives in adhesives, coatings and inks. Maleic anhydride contributes polarity, adhesion and lowers crystallinity. The maleic anhydride content in the polymers, or their saponification number or acid number, is determined by method ASTM D-1386 method. Polymers with high saponification number contain a high content of maleic anhydride. Commercial grades of maleated polyolefins are commonly available in saponification number from about 5 to 100. The maleic anhydride group in the polymer provides reactive sites for making water-based emulsions of the polymer. The number average molecular weight (Mn) of maleated polyolefins commonly ranges from 2,000 to 6,000 and their weight average molecular weight (Mw) commonly ranges from 5,000-20,000. The molecular weight (for both Mn and Mw) is determined by Gel Permeation Chromatography (GPC). The density of the polymers commonly ranges from 0.90 to 1.00 g/cc as determined by method ASTM D-1505. The Mettler drop point of the polymers commonly ranges from 100° C. to 160° C., as determined by method ASTM D-3954. The viscosity at 140° C. of the maleated polyethylenes commonly ranges from 500 to 5,000 cps as determined by a Brookfield rotational viscometer. The viscosity at 190° C. of the maleated polypropylenes commonly ranges from 300 to 3,000 cps as determined by a Brookfield rotational viscometer. The hardness values of the polymers range from less than 0.5 to 15 dmm as determined by method ASTM D-5.

Maleated polyolefin is commercially available from, for example, Honeywell International Inc.

Non-limiting examples of processes of making a combination, mixture, dispersion or emulsion of acrylate polymer or acrylate copolymer, rosin esters and the second polymer of the present invention are described in the Examples below.

In some embodiments of the present adhesion composition, and particularly the adhesion emulsions, the first polymer is present at a concentration of between about 50 weight % and about 99 weight % of the total dry weight of the composition; the tackifier is present at a concentration of between about zero weight % and about 40 weight % of the total dry weight of the composition; and the second polymer is present at a concentration of between about 1 weight % and about 17.5 weight % of the total dry weight of the composition. In other embodiments of the present invention, the first polymer is present at a concentration of between about 59 weight % and about 65 weight % of the total dry weight of the composition. In other embodiments of the present invention, the first polymer is present at a concentration of between about 65 weight % and about 75 weight % of the total dry weight of the composition. In other embodiments of the present invention, the first polymer is present at a concentration of between about 75 weight % and about 85 weight % of the total dry weight of the composition. In other embodiments of the present invention, the first polymer is present at a concentration of between about 85 weight % and about 99 weight % of the total dry weight of the composition. In some embodiments of the present invention, the tackifier is present at a concentration of between about zero weight % and about 10 weight % of the total dry weight of the composition. In other embodiments of the present invention, the tackifier is present at a concentration of between about 10 weight % and about 20 weight % of the total dry weight of the composition. In other embodiments of the present invention, the tackifier is present at a concentration of between about 20 weight % and about 30 weight % of the total dry weight of the composition. In other embodiments of the present invention, the tackifier is present at a concentration of between about 30 weight % and about 40 weight % of the total dry weight of the composition. In some embodiments of the present invention, the second polymer is present at a concentration of between about 1 weight % and about 4 weight % of the total dry weight of the composition. In other embodiments of the present invention, the second polymer is present at a concentration of between about 4 weight % and about 8 weight % of the total dry weight of the composition. In other embodiments of the present invention, the second polymer is present at a concentration of between about 8 weight % and about 12 weight % of the total dry weight of the composition. In other embodiments of the present invention, the second polymer is present at a concentration of between about 13 weight % and about 17.5 weight % of the total dry weight of the composition. In other embodiments of the present invention, the second polymer is present at a concentration of between about 17.5 weight % and about 30 weight % of the total dry weight of the composition.

In a further embodiment, the surface of a member to be adhered may be subjected to a suitable known or conventional surface treatment, e.g., a physical treatment such as a corona discharge treatment or a plasma treatment, a chemical treatment such as an undercoat treatment or a backside-treatment, or the like, prior to application of the adhesion compositions of the invention.

The term "wax" as used herein refers to polymer products, such as those commercially available from Honeywell International Inc. under the following trade names: A-C® 5120, A-C® 645P, A-C® 655 and A-C® 656.

The following examples further illustrate the invention, but should not be construed to limit the scope of the invention in any way.

EXAMPLES

Example 1: Preparation of Pressure-Sensitive Adhesives and Pressure-Sensitive Adhesive Labels A jacketed vessel was pre-heated to a temperature of 95-100° C. The temperature was controlled by an oil jacket, which contained oil at a temperature of about 115-120° C. 320 g of water was then added to the vessel and the temperature was adjusted to 96-99° C. Stirring (using Lightning RS500 saw tooth type blades) was commenced and a small amount potassium hydroxide was added and mixed with the water for 5 minutes. A small amount (less than about 2%) of the surfactant JPHOS® 1066 (commercially available from J1 Technologies Ltd., Manchester, UK), which contains an alkylether phosphate ester and phosphoric acid, was then added and mixed with the water for 5 minutes to form the aqueous phase of the emulsion. Ethylene-acrylic acid copolymer commercially available from Honeywell International Inc. under the trade name A-C® 5120, or a 25:75 mixture of said copolymer and the oxidized polyethylene polymer commercially available from Honeywell International Inc. under the trade name A-C® 656 was pre-melted with additives (5% w/w of Technical White Oil) at a temperature of about 110-115° C. The material, once molten, was then mixed with low speed agitation. The stirring speed was then increased to 960-1000 RPM and this molten wax phase was added, over a period of 3-5 minutes, to the center of the mixer containing the aqueous phase (see above). The temperature was maintained at 97-99° C. A pre-emulsion was thus formed at this stage and was mixed for another 5 minutes. 16 g of potassium hydroxide was added over a period of 1-2 minutes. At this stage a gradual increase in viscosity was observed as more potassium hydroxide was added. Mixing continued for another 5 minutes. The average particle size of the resulting emulsion was in the range of 0.3-0.6 microns. The pH of this high viscosity emulsion was then adjusted without affecting the particle size. Specifically, a small amount of 85% acetic acid in an amount of 1% of the total emulsion (v/v) was added to 60 g of hot water (temperature was in the range of 80-90° C.) in a separate vessel and the resulting mixture was stirred. This diluted acetic acid was then added to the viscous emulsion (see above) over a period of 1-2 minutes. The emulsion became thinner and its viscosity was dramatically reduced. The final product was initially cooled using the vessel jacket and then flash cooled in a sink or in-line cooler to 35° C. A small amount of biocide was added to the product once the temperature was below 35° C. The product was then filtered through 200 microns filter to produce emulsified polymer particles corresponding to the second polymer b) of the present invention. The final specification for the emulsion of the second polymer b) was as follows: the solids content was about 56%; the viscosity was 350 to 1500 cps (60 RPM Brookfield no. 3 spindle); the pH was 8-8.5; the D50 particle size was 0.35 to 0.6 microns. The emulsion of the other waxes described herein (A-C® 655, A-C® 645P) can be prepared using similar processes.

The first polymer component (a) in the form of an acrylate polymer or copolymer emulsion was then provided, and the pH was adjusted to 7.5-8.0. and the dispersed tackifier resin added slowly over a period of 1-2 minutes with low speed stirring (200-400 RPM). After 5 minutes, the wax emulsion (see above) was added over a period of 1-2 minutes and the resulting mixture was stirred for 5 minutes. A wetting agent (LUMITIN® ISC (BASF)) was added and, optionally, water was also added to reach the desired viscosity. The adhesives were adjusted to 300-800 cps at 60 RPM Brookfield number 3 spindle 60 RPM. The different adhesives were then applied to labels according to procedures commonly known in the art and the labels were tested as set forth elsewhere herein.

Adhesives having different relative concentrations of an acrylate polymer or copolymer, a tackifier resin and second polymer selected from the group consisting of ethylene-acrylic acid copolymer, oxidized polyethylene, oxidized ethylene-vinyl acetate copolymer, maleated polyolefin and combinations of two or more thereof, were produced by using appropriate amounts of starting materials. For example, the adhesive described in Example 2, below, was produced by combining 72 parts (by weight) of the acrylate copolymer commercially available from BASF Corporation, Charlotte, N.C., USA, under the trade name ACRONAL® V215 with from about 14 parts to about 28 parts (by weight) of rosin ester resin commercially available from Eastman Chemical Company, Kingsport, Tenn., USA, under the trade name TACOLYN™ 3509 and 0 to about 14 parts (by weight) of ethylene-acrylic acid copolymer commercially available from Honeywell International Inc. under the trade name A-C® 5120 to result in a total of 100 parts. Amounts of these different components in the final adhesive can also be determined using commonly known techniques that are standard in the art.

Example 2: Testing of Pressure-Sensitive Adhesive Labels

Figure 2:
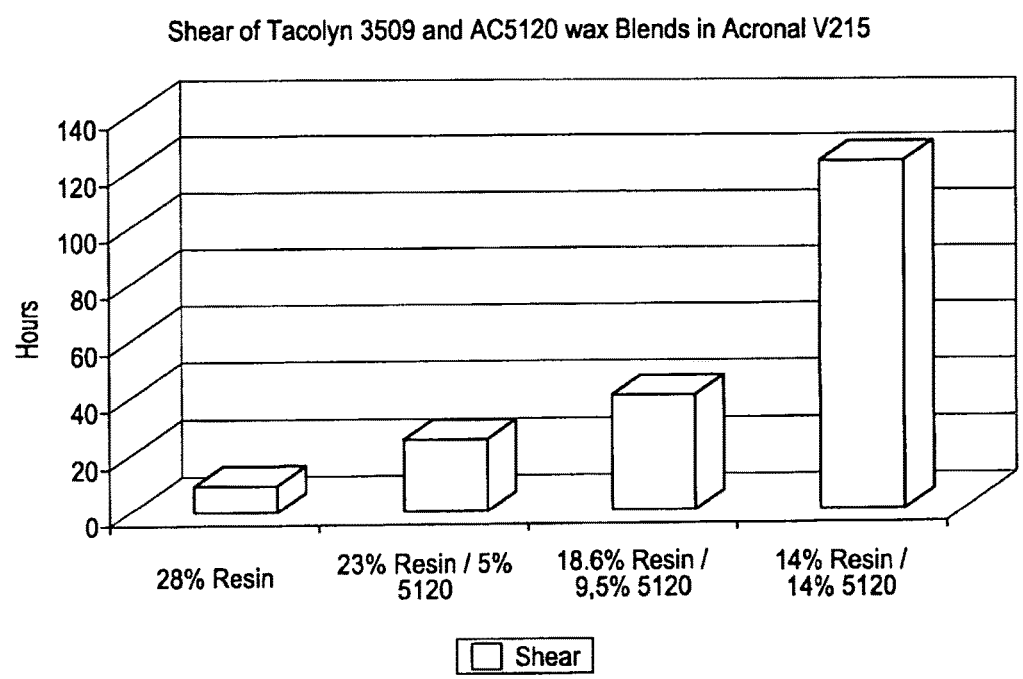
FIG. 2 shows the shear adhesion properties of the same pressure-sensitive adhesives the properties of which are shown in FIG. 1, except that the scale of the histogram has been enlarged.
Figure 3:
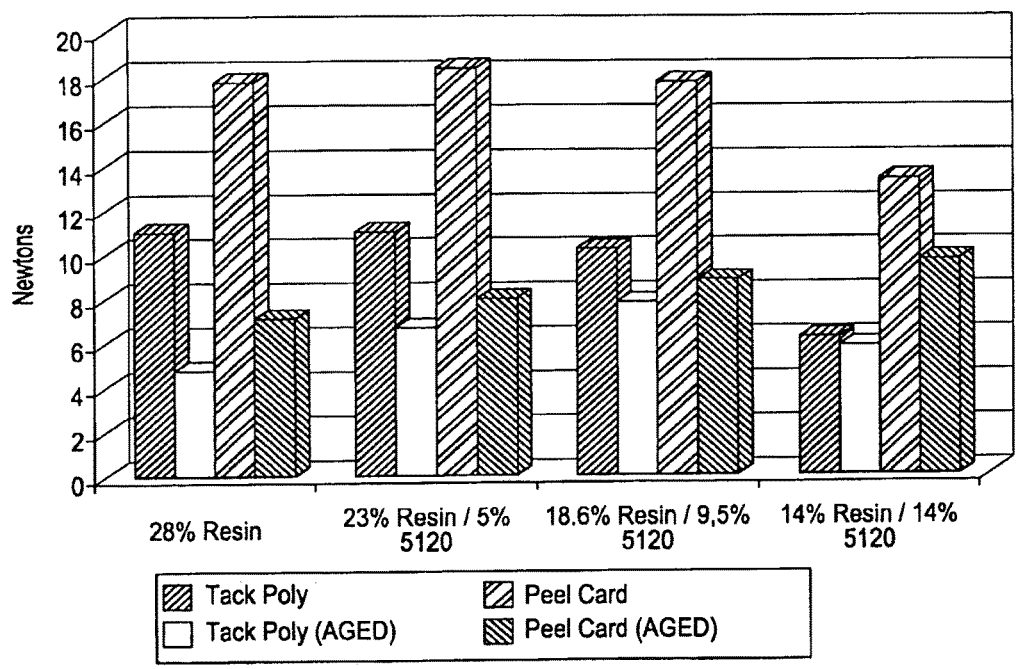
FIG. 3 shows a chart of the adhesion properties, including the effect of ageing, on different substrates of pressure-sensitive adhesives according to the procedures and materials described in Example 1.

Pressure-sensitive adhesive tapes containing different adhesives, described in Example 1 above, were tested for resistance to shear on stainless steel (Shear), loop tack to low density polyethylene (Tack Poly) and to stainless steel (Tack SS), and peel adhesion to card board (Peel Card) and to low density polyethylene (Peel Poly). Measurements were performed as described above, except that stainless steel was exchanged for low density polyethylene and card board as the adherent, as indicated in FIG. 1. FIG. 1 shows adhesion properties on different substrates of pressure-sensitive adhesives containing about 72 weight % (of the total weight of the adhesive) of the acrylate copolymer commercially available from BASF Corporation, Charlotte, N.C., USA, under the trade name ACRONAL® V215. In addition, the pressure-sensitive adhesives contain rosin ester resin commercially available from Eastman Chemical Company, Kingsport, Tenn., USA, under the trade name TACOLYN™ 3509 and ethylene-acrylic acid copolymer commercially available from Honeywell International Inc. under the trade name A-C® 5120 in the indicated weight % (of the total weight of the adhesive). The units of measurement are Newton per inch (about 2.5 cm; peel and tack) and hours (shear). The order in which the test results regarding the different adhesives are depicted in the histogram corresponds to the order in which the different adhesives are mentioned in the figure legend below the histogram (left to right, top to bottom; this also applies to FIGS. 2-6). The bars reflecting the shear adhesion of the two adhesives containing the highest amounts of the A-C® 5120 product are cut off by the small scale of the histogram of this figure. A larger scale histogram that correctly reflects the shear adhesion of these adhesives is depicted in FIG. 2. Shear adhesion was determined based on the adhesion to stainless steel. Loop tack was determined based on the adhesion to low density polyethylene (Tack Poly) or stainless steel (Tack SS). Peel adhesion was determined based on the adhesion to low density polyethylene (Peel Poly) or card board (Peel Card).

The pressure-sensitive adhesive tapes were then aged for three days at 50° C. in 100% relative humidity and tested for loop tack to low density polyethylene (Tack Poly) and for peel adhesion to card board (Peel Card) (FIG. 3), as described above.

Figure 4:
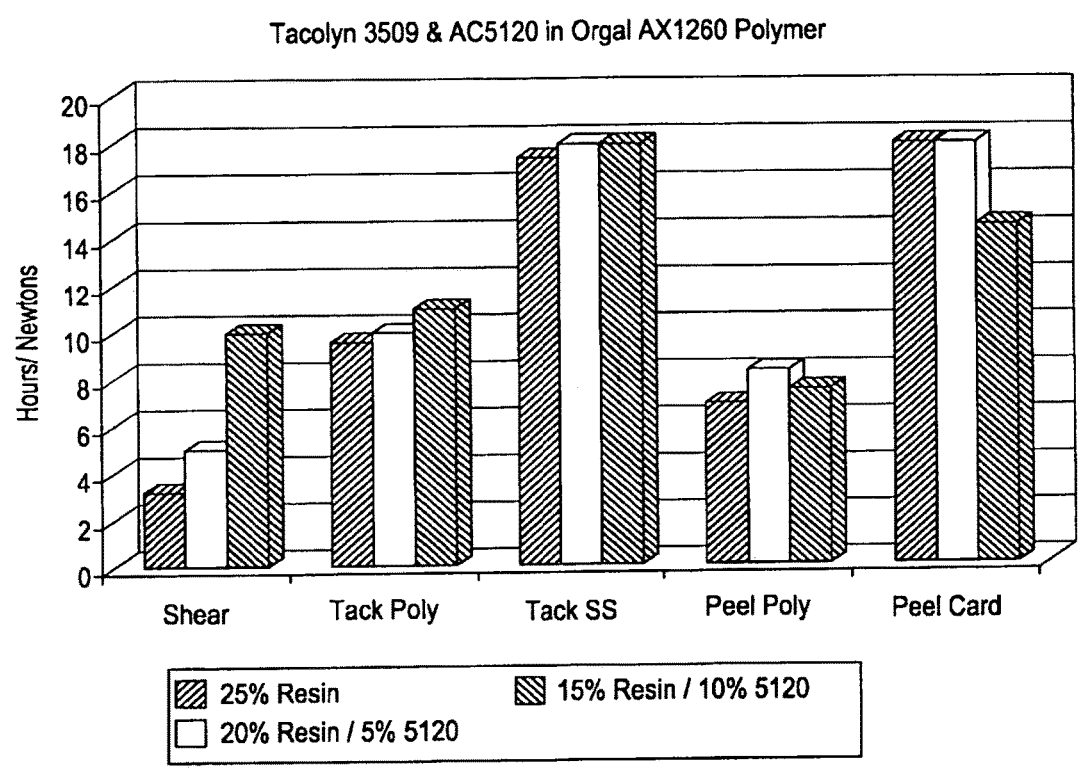
FIG. 4 shows a chart of the adhesion properties on different substrates of pressure-sensitive adhesives according to the procedures and materials described in Example 1.
Figure 5:
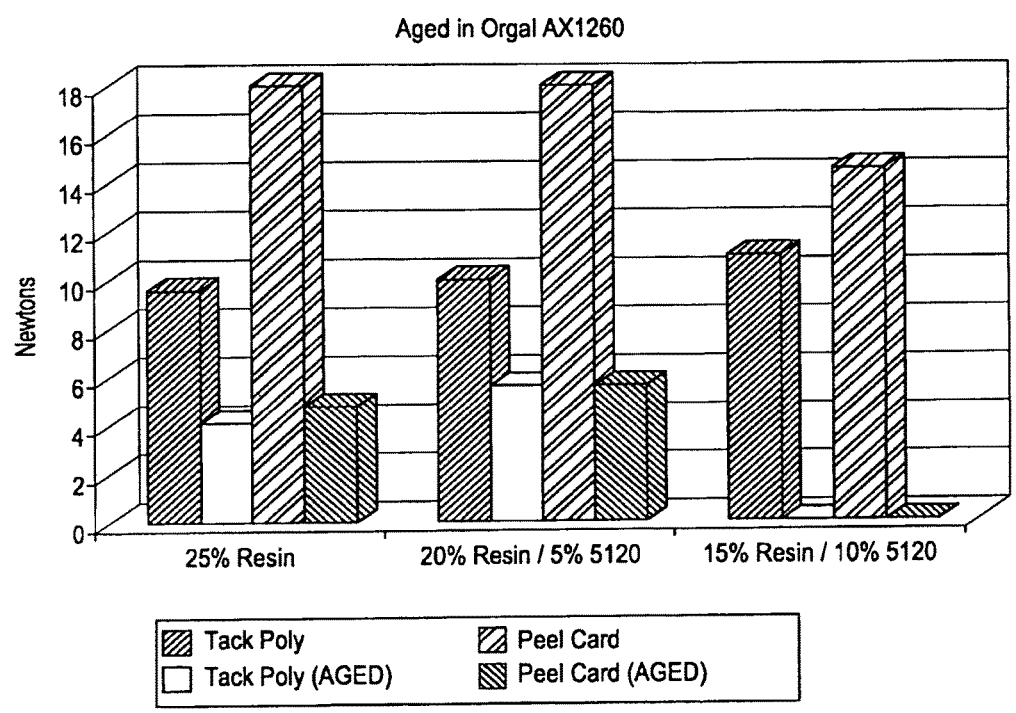
FIG. 5 shows a chart of the adhesion properties, including the effect of ageing, on different substrates of pressure-sensitive adhesives according to the procedures and materials described in Example 1.

Similar tests were conducted with pressure-sensitive adhesives that contained an acrylate copolymer commercially available from Organik Kimya, Turkey, under the name ORGAL AX1260 instead of the ACRONAL® V215 product (FIGS. 4 and 5). There are no data points with respect to the aged adhesive comprising 10% of the A-C® 5120 wax product (FIG. 5).

Figure 6:
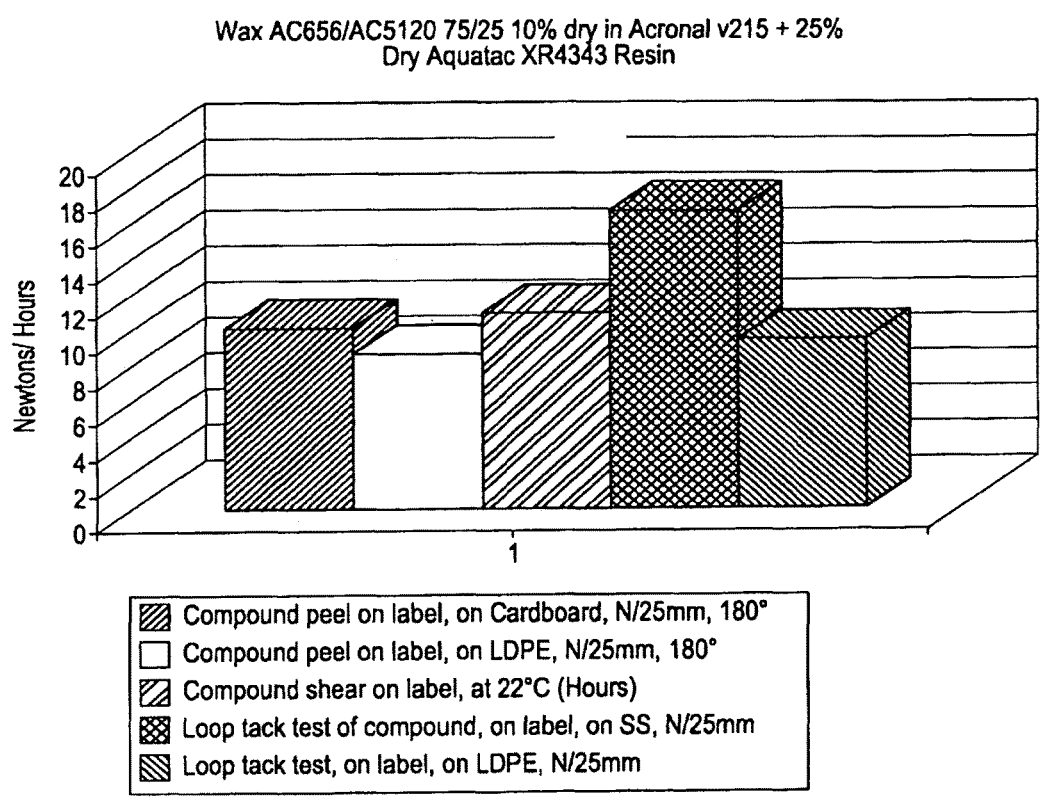
FIG. 6 shows a chart of the adhesion properties on different substrates of pressure-sensitive adhesives according to the procedures and materials described in Example 1.

Similar tests were also conducted with pressure-sensitive adhesives that contained about 65 weight % (of the total weight of the adhesive) of the acrylate copolymer commercially available from BASF Corporation, Charlotte, N.C., USA, under the trade name ACRONAL® V215, about 25 weight % (of the total weight of the adhesive) of the rosin dispersion commercially available from Arizona Chemical, Fla., USA, under the trade name AQUATAC™ XR 4343, and about 10 weight % (of the total weight of the adhesive) of a 25:75 mixture of the ethylene-acrylic acid copolymer commercially available from Honeywell International Inc. under the trade name A-C® 5120 and the oxidized polyethylene polymer commercially available from Honeywell International Inc. under the trade name A-C® 656 (FIG. 6). FIG. 6 shows the results of measurements similar to those underlying FIG. 1. SS stands for stainless steel and LDPE stands for low density polyethylene.

The above measurements show that the adhesives containing the A-C® 5120 wax product had significantly better shear resistance than the adhesives without it. As can be seen in FIGS. 1 and 2, for example, the adhesive comprising 14% of the A-C® 5120 wax product had a shear resistance of almost 120 hours, whereas the adhesive without it had a shear resistance of only about 8 hours. After aging, the adhesives containing the A-C® 5120 wax product appeared to perform significantly better than the adhesives without it.

Example 3: Other Pressure-Sensitive Adhesives

Pressure-sensitive adhesives are also prepared that comprise the polymer products commercially available from Honeywell International Inc. under the trade names A-C® 645P and A-C® 655. These pressure-sensitive adhesives are manufactured in accordance with the information provided in Example 1 and are subjected to tests as those above.

Example 4: Pressure-Sensitive Adhesives Without Rosin

Pressure-sensitive adhesives are also prepared that contain no rosin tackifier resin. These adhesives contain only the first polymer that is acrylate polymer or copolymer comprising polymerized monomers selected from the group consisting of acrylic acid, butyl acrylate, 2-ethylhexyl acrylate, methyl methacrylate, octyl acrylate, styrene, vinyl acetate and combinations of two or more thereof; and the second polymer selected from the group consisting of ethylene-acrylic acid copolymer, oxidized polyethylene, oxidized ethylene-vinyl acetate copolymer, maleated polyolefin and combinations of two or more thereof. These pressure-sensitive adhesives are manufactured in accordance with the information provided in Example 1 and are subjected to tests as those described above.

Example 5: Heat Seal Adhesive

Two water-based heat seal adhesives are prepared for evaluations. Sample A (control) is an ethylene-vinyl acetate emulsion (60% solids). Sample B is a blend of 90% ethylene-vinyl acetate emulsion (Sample A) and 10% of low molecular weight ethylene-acrylic acid copolymer (A-C® 5120 from Honeywell) emulsion (53% solids). The emulsions are coated on a 2-mil aluminum foil and dried in a forced air oven at 105° C. to yield 30 gm of coating. The coated foil is cut into small individual pieces (1 in×6 in) which are then heat sealed to uncoated aluminum foil at 60 psi using a dwell time of 2 seconds and a temperature of 80° C. After conditioning for 24 hours at 72° F. and a relative humidity of 50%, the laminates are delaminated with a tensile tester at a speed of 12 in/min. Peel force is measured and recorded. Sample B shows 25% higher peel adhesion than sample A.

Example 6: Rheology of Water-Based Acrylic Pressure Sensitive Adhesives

ACRONAL® V215 (BASF) is a popular water-based acrylic pressure sensitive adhesive, supplied at 69% solids, that is widely used in the production of self-adhesive labels and tapes. The ACRONAL® V215 was combined with a 40% solids emulsion of an ethylene-acrylic acid (EAA) copolymer, having 15% acrylic acid by weight and a number average molecular weight of approximately 2000 Daltons, to give stable water-based adhesive compositions A, B, C and D. Samples were cast and dried in silicone rubber molds to yield dry adhesive sections suitable for rheological evaluation.

Dynamic mechanical analyses were performed using a TA Instruments AR2000 Rheometer fitted with a stainless steel parallel plate geometry (8 mm diameter and a measurement gap of 1000 μm) at an oscillation frequency of 1.0 Hz and an applied maximum strain of 0.050%. For each measurement a fixed temperature ramp (2.5° C./minute) was applied to the samples to permit evaluation of their viscoelastic properties as a function of temperature.

The results are presented in Table 1, which includes data at −25, 0 and 25° C.

TABLE 1

Viscoelastic Response of Unmodified and Modified Water-based Acrylic Pressure Sensitive Adhesives

| Description | Adhesive A | Adhesive B | Adhesive C | Adhesive D |
|---|---|---|---|---|
| Composition: Acrylic/Ethylene-acrylic Acid Copolymer (Dry/Dry) | 100/0 | 95/5 | 90/10 | 85/15 |
| Temperature: −25° C. | | | | |
| Elastic Modulus (G') (Pa) | 280,000 | 8,824,000 | 8,422,000 | 6,711,000 |
| Viscous Modulus (G") (Pa) | 134,000 | 6,570,000 | 7,990,000 | 7,888,000 |
| Tan Delta (=G"/G') (None) | 0.48 | 0.75 | 0.95 | 1.17 |
| Temperature: 0° C. | | | | |
| Elastic Modulus (G') (Pa) | 40,670 | 1,000,000 | 296,300 | 272,900 |
| Viscous Modulus (G") (Pa) | 18,640 | 631,600 | 280,900 | 232,700 |
| Tan Delta (=G"/G') (None) | 0.46 | 0.63 | 0.95 | 0.85 |
| Temperature: 25° C. | | | | |
| Elastic Modulus (G') (Pa) | 1,780 | 87,990 | 68,640 | 70,050 |
| Viscous Modulus (G") (Pa) | 1,360 | 60,620 | 40,290 | 40,090 |
| Tan Delta (=G"/G') (None) | 0.76 | 0.69 | 0.59 | 0.57 |

The viscoelastic balance (as described by the Tan Delta value) of adhesives A, B, C and D was found to be consistent with pressure sensitive performance; however, the elastic and viscous moduli of adhesives B, C and D was found to be significantly greater than those of adhesive A. Thus, adhesives B, C and D offer superior bonding and load bearing performance as a consequence of the inclusion of the ethylene-acrylic acid copolymer.

Example 7: Adhesive Performance of a Water-Based Vinyl Acetate Ethylene Acrylic Acid Ester Adhesive MOWILITH® LDM1365 (Celanese) is an aqueous copolymer dispersion based on vinyl acetate, acrylic acid esters and ethylene (VAE) supplied at 60% solids. It is a widely used raw material in the compounding of adhesives for paper and packaging markets. MOWILITH® LDM1365 was combined with an ethylene-acrylic acid copolymer emulsion, a wetting agent and water to give water-based adhesive compositions X and Y at approximately 55% solids. The emulsion of the ethylene-acrylic acid copolymer was prepared at 53% solids and featured a copolymer with 15% acrylic acid by weight and a number average molecular weight of approximately 2000 Daltons. The wetting agent, JMULSE® 1444B3 (J1 Technologies), was included at 0.7% in the aqueous mixture. Adhesive coatings were prepared on 25 nm polyester film at a constant dry coat weight (of 24 gsm) for testing. The peel, loop tack, probe tack and shear characteristics of these coatings were evaluated according to well established test methods; see Table 2.

TABLE 2

Adhesive Performance of Unmodified and Modified Water-based VAE Adhesive

| Description | Adhesive X | Adhesive Y |
|---|---|---|
| Composition: VAE/Ethylene-acrylic Acid Copolymer (Dry/Dry) | 100/0 | 100/15 |
| Adhesive Performance | | |
| Peel (from Stainless Steel) (N/25 mm) | 5.9 | 6.8 |
| Loop Tack (to Stainless Steel) (N/25 mm) | 6.6 | 7.0 |

TABLE 2-continued

Adhesive Performance of Unmodified and Modified Water-based VAE Adhesive

| Description | Adhesive X | Adhesive Y |
|---|---|---|
| Probe Tack (N) | 0.28 | 0.52 |
| Lap Shear (to Stainless Steel) (Hours) | 90 | >450 |

The characteristics of the modified adhesive (Y) were found to be superior to those of the unmodified product (X).

Example 8: Rheology of a Water-Based Vinyl Acetate Ethylene Acrylic Acid Ester Adhesive Dynamic mechanical analyses were conducted to determine the viscoelastic characteristics of adhesives X and Y (described in Example 7). Samples were cast and dried in silicone rubber molds to give dry adhesive sections suitable for testing. Using a TA Instruments AR2000 Rheometer fitted with a stainless steel parallel plate geometry (8 mm diameter and with a measurement gap of 1000 μm) measurements were performed at an oscillation frequency of 1.0 Hz and an applied maximum strain of 0.025%. For each measurement a fixed temperature ramp (1.0° C./minute) was applied to the samples to permit evaluation of their properties as a function of temperature. The results are presented in Table 3.

TABLE 3

Viscoelastic Response of Unmodified and Modified Water-based VAE Adhesives

| Parameter | Adhesive X | | Adhesive Y | |
|---|---|---|---|---|
| | −4.0° C. | 25.0° C. | −4.0° C. | 25.0° C. |
| Elastic Modulus (G') (Pa) | 309,400 | 61,610 | 502,400 | 113,000 |
| Viscous Modulus (G") (Pa) | 250,500 | 29,530 | 454,400 | 56,120 |
| Tan Delta (=G"/G') (None) | 0.81 | 0.48 | 0.90 | 0.50 |

The inclusion of the ethylene-acrylic acid copolymer in the adhesive did not modify its viscoelastic balance (as illustrated by the Tan Delta values); however the elastic and viscous moduli of adhesive Y were found to be significantly greater than those of adhesive X. Thus, adhesive Y offers superior bonding and load bearing performance as a consequence of its modification.

Example 9: Adhesive Performance of a Tackified Water-Based Adhesive

The impact of incorporating an ethylene-acrylic acid copolymer emulsion in a tackified water-based acrylic pressure sensitive adhesive was considered. An adhesive base was formulated with ACRONAL® V215 (BASF), a water-based acrylic pressure sensitive adhesive, EMULTROL® E177 (Concentrol Chemical Specialities), an aqueous dispersion of a rosin ester tackifier, and JMULSE® 1444B3 (J1 Technologies), a wetting agent, to which an emulsion of an ethylene-acrylic acid copolymer was added. The composition of the adhesive base was ACRONAL® V215 (100.0 parts by weight), EMULTROL® E177 (40.5 parts by weight) and JMULSE® 1444B3 (1.3 parts by weight). The adhesive base was combined with an ethylene-acrylic acid copolymer emulsion prepared at 53% solids featuring a copolymer having 15% acrylic acid by weight and a number average molecular weight of approximately 2000 Daltons. Pressure sensitive laminates were then prepared. The wet adhesive was applied to a silicone coated release liner and dried in a laboratory oven to give a uniform dry adhesive coating (of 20 gsm), which was laminated with 80 g face paper. The resulting laminates were conditioned at 23±1° C./50±5% RH prior to testing according to well established procedures; see Table 4.

TABLE 4

Adhesive Performance of Unmodified and Modified Tackified Water-based Adhesive

| Description | Adhesive K | Adhesive L | Adhesive M |
|---|---|---|---|
| Composition: Adhesive Base/Ethylene-acrylic Acid Emulsion (as supplied) | 100/0.0 | 100/6.2 | 100/9.5 |
| Adhesive Performance | | | |
| Peel (from Low Density Polyethylene) (N/25 mm) | 7.2 | 7.9 | 8.2 |
| Loop Tack (to Stainless Steel) (N/25 mm) | 18.5 | 19.7 | 19.9 |
| Lap Shear (to Stainless Steel) (Hours) | 9.2 | 14.2 | 33.6 |

The peel, tack and shear performance of the modified adhesives (L and M) were found to be superior to those of the unmodified adhesive (K).

Example 10: Adhesive Performance of a Water-Based Acrylic Adhesive

Adhesive HKJ23 (Adhesivos) is an aqueous acrylic copolymer dispersion supplied at about 53.5% solids. It is a widely used raw material in the compounding of adhesives for paper, polyolefin labels and decals market. The Adhesivos HKJ23 was combined with an ethylene-acrylic acid copolymer emulsion and ethylene-acrylic acid copolymer (25%)/oxidized polyethylene (75%) dispersion to give water-based adhesive compositions at approximately 55% solids. The emulsion of the ethylene-acrylic acid copolymer was prepared at 53% solids and featured a copolymer with 15% acrylic acid by weight and a number average molecular weight of approximately 2000 Daltons. The emulsion of ethylene-acrylic acid copolymer (25 weight %) and oxidized polyethylene (75 weight %) was prepared at approximately 50% solids and its number average molecular weight was determined to be approximately 1,300. The formulations are listed in Table 5A. Adhesive coatings were prepared on 25 μm polyester film at a constant dry coat weight (of 24 gsm) for testing. Their peel, loop tack and shear characteristics were evaluated according to well established test methods; see Table 5B.

TABLE 5A

Adhesive Formulations

| | Adhesive P | Adhesive Q | Adhesive R | Adhesive S | Adhesive T |
|---|---|---|---|---|---|
| Adhesivos HJK23 | 100 | 100 | 100 | 100 | 100 |
| Emulsion of ethylene-acrylic acid copolymer | | 7.4 | 14.8 | | |
| Emulsion of ethylene-acrylic Acid copolymer (25%)/oxidized Polyethylene(75%) | | | | 8.2 | 16.4 |

TABLE 5B

Adhesive Performance of Unmodified and Modified Water-based Acrylic Adhesives

| | Adhesive P | Adhesive Q | Adhesive R | Adhesive S | Adhesive T |
|---|---|---|---|---|---|
| Peel (from stainless steel) (N/25 mm) | 4.5 | 4.9 | 2.8 | 6.7 | 6.6 |
| Loop Tack (to Stainless Steel) (N/2 mm) | 1.5 | 1.6 | 1.6 | 1.7 | 1.5 |
| Lap Shear (to Stainless Steel) (Hours) | 9.2 | 34.0 | 85.1 | 30.7 | 21.3 |

The characteristics of the modified adhesive (Q, R, S and T) were found to be superior to those of the unmodified product (P).

Example 11: Process for Preparation of EAA Emulsion, A-C® 5120 Emulsion

Formulation:

| Example 11 | | |
|---|---|---|
| | grams | % |
| Aqueous Phase | | |
| Hot Water | 355.0 | 35.3% |
| KOH 50% (1) | 5.0 | 0.5% |
| JSURF ® 3257 | 9.0 | 0.9% |
| Wax Phase (Preblended) | | |
| A-C ® 5120 | 490.0 | 48.8% |
| Technical White Oil | 25.0 | 2.5% |
| Emulsion Phase | | |
| KOH 50% (2) | 15.0 | 1.5% |
| Acetic Acid | 1.0 | 0.1% |
| Hot Water | 100.0 | 10.0% |
| JMULSE ® 1444B3 | 3.6 | 0.4% |
| PROXEL ® BD20 | 1.0 | 0.1% |
| Total | 1004.4 | 100.0% |

Process Description:

The wax and technical white oil were pre-blended and kept in an oven at 110-115° C. overnight. The wax/oil was mixed prior to use in the formulation using a simple lab mixer for 5 minutes.

The Emulsion vessel was preheated prior to the start of the process. Oil temperature was set at 120° C. The dispersion vessel was allowed to stabilize for 15 minutes after the addition of the hot water. Hot water at 95° C.+ was added to the Vessel the agitator blades were set running at 580 RPM. This was mixed for 15 Minutes. The first KOH was added and mixed for 5 minutes. JMULSE® 3527(J1) was added and also mixed for 5 mins. The temperature at this stage was checked and was normally found to be 92-95° C. The wax/technical white oil was added in a steady stream at a temperature of 110-115° C. over a period of 4-5 minutes. At this stage the temperature rose and it was found to be important to adjust the heating oil to compensate for any rise or loss in temperature. For the addition of the wax the mixer speed was increased to 960 RPM. Temperature after wax addition was normally found to be 97-99° C. On completion of the wax addition the product was held for 5 mins. At this stage the temperature was 95-99° C. The second KOH was added slowly over 2-3 minutes. At this stage, the necessity of the emulsion significantly increased. On completion of the KOH addition, the product was held for 10 mins at 960 RPM. The temperature was maintained at 95-99° C. (must be kept from boiling). At the end of the process a solution of acetic acid and hot water was added. The water temperature was at least 85° C. This was added over 2-3 minutes in a steady stream and the cooling was set to reduce the emulsion temperature below 45° C. This normally takes 45 minutes. After 5 minutes of mixing the speed of the disperser was reduced to 580 RPM. When the temperature fell below 50° C., the JMULSE® 1444B3 was added in a steady stream. Cooling was continued until the product reached 45° C., and the product was then discharged. The final emulsion was cooled in a sealed container to 30-35° C., filtered through 100 Mesh and placed into a sealed sample container.

The biocide was added to the final product. It was diluted 10/1 with water for the addition.

If the product appears very viscous at this stage extra water may be added to prevent skinning. If any skinning occurs during the final stages, the product may be refiltered.

Specification:
Solids content 54-56%
pH 7.5-8.5
Viscosity 350-800 Cps at 60 RPM no. 3 spindle Brookfield
Particle Size Typically 0.3/0.4 Microns X50

Example 12: Process for Preparation of PCP 002, A-C® 5656/A-C® 5120 Emulsion

Formulation:

| Example 12 | | |
|---|---|---|
| | grams | % |
| Aqueous Phase | | |
| Hot Water | 315.0 | 35.2% |
| KOH 50% (1) | 20.0 | 2.2% |
| JPHOS ® 1066 | 11.0 | 1.2% |
| Wax Phase (Preblended) | | |
| A-C ® 5120 | 100.0 | 11.2% |
| A-C ® 656 | 305.0 | 34.0% |
| Technical White Oil | 15.0 | 1.7% |
| Emulsion Phase | | |
| JPHOS ® 1066 | 5.0 | 0.6% |
| Acetic Acid | 1.0 | 0.1% |
| Hot Water | 120.0 | 13.4% |
| JMULSE ® 1444B3 | 3.0 | 0.3% |
| PROXEL ® BD20 | 1.0 | 0.1% |
| Total | 896.0 | 100.0% |

Process Description

The 2 wax components (A-C® 656 and A-C® 5120) were preblended with technical white oil and kept in an oven at 110-115° C. overnight. The wax/oil was mixed prior to use in the formulation using a simple lab mixer for 5 Minutes. The emulsion vessel was preheated prior to the start of the process. Oil temperature was set at 120° C. The dispersion vessel was allowed to stabilize for 15 minutes after the addition of the hot water.

Hot water at 95° C.+ was added to the vessel the agitator blades were set running at 580 RPM. This was mixed for 15 minutes. The KOH was added and mixed for 5 minutes. The first JPHOS® 1066 was added and also mixed for 5 mins. The temperature at this stage was checked and was normally found to be 92-95° C. The wax/technical white oil was added in a steady stream at a temperature of 110-115° C. over a period of 4-5 Minutes. At this stage the temperature rises and it was found to be important to adjust the heating oil to compensate for any rise or loss in temperature. For the addition of the wax, the mixer speed was raised to 960 RPM. Temperature after wax addition was normally found to be 97-99° C. On completion of the wax addition the product was held for 5 mins. At this stage the temperature was 95-99° C. The second JPHOS® 1066 was added slowly over 2-3 minutes. At this stage, the VIS of the emulsion increased.

On completion of the second JMULSE® addition the product was held for 10 mins at 960 RPM. The temperature was maintained at 95-99° C. (must be kept from boiling). Cooling was then applied and the product was cooled down to 85-88° C. with continued high speed mixing. At the end of the process a solution of acetic acid and hot water was added. The water was at least 85° C. This was added over 2-3 minutes in a steady stream and the cooling was set to reduce the emulsion temperature below 45° C. This normally takes 45 minutes. After 5 minutes mixing the speed of the disperser was reduced to 580 RPM. When the temperature of the product fell below 50° C. the JMULSE® 1444B3 was added in a steady stream. The product continued cooling to 45° C., and was then discharged. The final emulsion was cooled in a sealed container to 30-35° C., filtered through 100 Mesh and placed into a sealed sample container. The biocide was added to the final product. It was diluted 10/1 with water for the addition. If the product appears very viscous at this stage, extra water can be added to prevent skinning. If any skinning occurs during the final stages, the product can be refiltered.

Specification of Product:
Solids content 50-52%
pH 7.5-8.5
Viscosity 350-800 cps at 60 RPM, no. 3 spindle Brookfield
Particle Size Typically 0.7 Microns X50

Example 13: Testing Emulsions of Example 11, Example 12, and A-C® Polymer Additives in Chimigraf Flexographic Ink Formula Formula A, the control flexographic Ink formula from Chimigraf, was created by mixing 40 parts pigment (BLUE 206 HC CUAT from Chimigraf) and 60 parts of varnish (VARNISH COMPLEMENT 07 also from Chimigraf) and agitating with a Speed Mixer for 2 minutes at 3000 rpm. Formulas B-K (see Table below) were created by adding to Formula A an additional 5 to 25 parts of the emulsion of Example 11 (SF A-C® 5120 emlusion), emulsion of Example 12, or other A-C® polymer emulsion at 5 and 25% dosage respectively, and speed mixing for 30 sec at 3000 rpm.

Example 14: Adhesion (Tape Test) 1 Hour and 4 Hours after Coating

Figure 7:
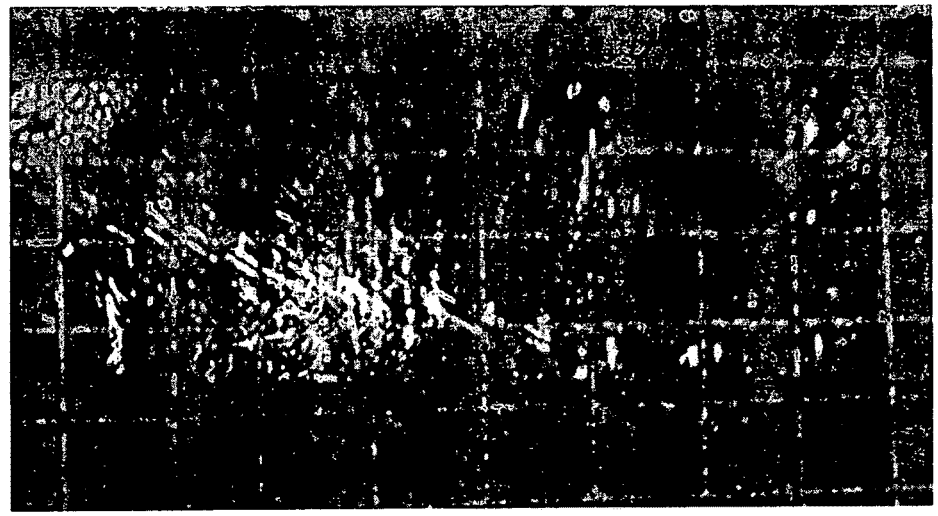
FIGS. 7 (A and B) shows an example of adhesion failure according to the procedure described in Example 14.
Figure 7:
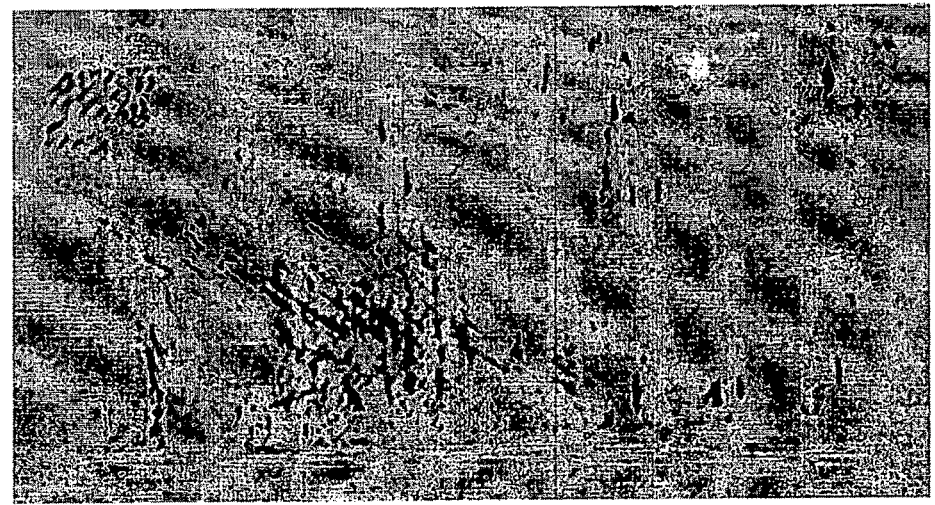

Adhesion tests were performed using lattice scoring on samples and SCOTCH® 610 adhesive tape pressed on then removed at two different speeds, a slow and a fast pull. Samples were graded 0 to 5, with 0 being no material removed and 5 being most of the material removed. Samples were air dried 1 hour and tested, then allowed to dry 3 more hours for a total of 4 hours and tested again. The pictures (FIG. 7) show an example depicting an adhesion failure. The blue spots on the clear tape (FIG. 7B) were lifted from the blue print; the white spots on the blue film (FIG. 7A) were the result of blue lifted from the print and transferred on the clear tape.

Example 15: Sutherland Rub Resistance Before and After Water Immersion

Sutherland rub test was performed using samples taped to the bed and a course white typing paper taped to a 4 pound test weight and cycled 400 times. Samples were air dried 24 hrs, then the starting sample was run and samples were placed separately in a bucket of 2° C. water for 4 hours, and a bucket of ambient temperature water for 24 hours, and then tested. Samples were graded on a 0 to 5 scale for amount of ink transferred to paper, with 0 being no color and 5 being a heavy transfer of ink. Most samples were pale (2) to very faint (1) with a point added for serious streaks.

| | Substrate | Adhesion Test 1 Hr slow/fast | Adhesion Test 4 Hr slow/fast | Sutherland Rubs Start | Sutherland Rubs 4 hr Cold | Sutherland Rubs 24 hr Amb | Notes |
|---|---|---|---|---|---|---|---|
| Formula A: Control | PP | 4/4 | 3/3 | 1 | 1 | 1 | Some faint streaks on rubs, powdery flaking on adhesion test |
| | White | 3/3 | 3/3 | 1 | 1 | 1 | Some faint streaks on rubs, powdery flaking on adhesion test |
| | PE | 1/1 | 1/1 | 1 | 1 | 1 | Finger prints on substrate of 4 hour adhesion test |
| Formula B: control with 5% Example 12 added | PP | 3/2 | 2/2 | 1 | 1 | 1 | Some faint streaks on rubs, powdery flaking on adhesion test |
| | White | 3/3 | 4/2 | 1 | 1 | 2 | powdery flaking on adhesion test |
| | PE | 3/2 | 2/2 | 1 | 1 | 1 | |
| Formula C: control with 25% Example 12 added | PP | 3/3 | 3/3 | 1 | 1 | 1 | powdery flaking on adhesion test |
| | White | 2/2 | 2/2 | 2 | 2 | 2 | powdery flaking on adhesion test |
| | PE | 1/1 | 1/1 | 2 | 2 | 2 | |
| Formula D: control with 5% Example 11 added | PP | 4/4 | 4/3 | 2 | 1 | 1 | powdery flaking on adhesion test |
| | White | 3/2 | 3/2 | 2 | 1 | 2 | powdery flaking on adhesion test |
| | PE | 2/3 | 1/1 | 2 | 2 | 1 | minor powdery flaking on adhesion test |

-continued

| | Substrate | Adhesion Test 1 Hr slow/fast | Adhesion Test 4 Hr slow/fast | Sutherland Rubs Start | Sutherland Rubs 4 hr Cold | Sutherland Rubs 24 hr Amb | Notes |
|---|---|---|---|---|---|---|---|
| Formula E: control with 25% Example 11 added | PP | 3/3 | 2/2 | 2 | 2 | 1 | powdery flaking on adhesion test, streaks on rub |
| | White | 3/2 | 2/2 | 2 | 2 | 1 | powdery flaking on adhesion test, streaks on rub |
| | PE | 2/1 | 2/2 | 1 | 2 | 1 | minor powdery flaking on adhesion test |
| Formula F: control with 5% A-C ® 907 emulsion added | PP | 3/3 | 2/2 | 1 | 1 | 1 | some powdery flaking on adhesion test |
| | White | 3/2 | 2/2 | 1 | 1 | 1 | some powdery flaking on adhesion test |
| | PE | 1/1 | 1/1 | 1 | 1 | 1 | |
| Formula G: control with 5% GS WB emulsion added | PP | 4/4 | 3/3 | | | | powdery flaking on adhesion test |
| | PE | 2/2 | 2/2 | | | | |
| Formula H: control with 5% A-C ® 325 emulsion added | PP | 5/4 | 3/2 | | | | powdery flaking on adhesion test |
| | PE | 1/1 | 1/1 | | | | |
| Formula I: control with 5% A-C ® 645 emulsion added | PP | 4/4 | 3/3 | | | | powdery flaking on adhesion test |
| | PE | 2/2 | 1/1 | | | | |
| Formula J: control with 25% A-C ® 907 emulsion added | PP | 4/4 | 3/2 | 1 | 1 | 1 | powdery flaking on adhesion test |
| | White | 2/2 | 2/2 | 1 | 1 | 1 | some powdery flaking on adhesion test |
| | PE | 1/1 | 1/1 | 1 | 1 | 1 | |
| Formula K: control with 5% Example 12 and 5% A-C ® 907 emulsion added | PP | 3/4 | 2/2 | 2 | | | |
| | White | 2/2 | 2/2 | 2 | | | |
| | PE | 1/1 | 1/1 | 2 | | | |

Additional Observations:

All samples passed a fingernail scratch test.

Some minor mixing/compatibility issues with the 25% A-C® 5120 emulsion (Example 11) in Formula E, and 5% emulsion of Example 12 in formula B may have caused some spotting of samples and streaks on rubs.

Some samples had powdery flaking on the adhesion test which is believed to be pigment on the surface of the film.

Example 16: A Surfactant-Free Emulsion of an Ethylene Acrylic Acid Copolymer

Example 16 is an oil-in-water emulsion of a single ethylene acrylic acid copolymer formulated at 40% by weight of the copolymer. The copolymer possesses 15% acrylic acid by weight and has a number average molecular weight of approximately 2000 Daltons. A surfactant-free emulsion of the copolymer was simply created by partial conversion of the copolymer to its soap through the use of a base Ammonium hydroxide was used in this particular example; however, many other inorganic and organic bases are suitable. The formulation of Example 16 is described in Table 6. Table 6: Emulsion Formulation of Example 16

| Component | Weight (%) |
|---|---|
| Ethylene Acrylic Acid Copolymer | 40.00 |
| 30% Ammonium Hydroxide Solution | 2.00 |
| Water | 58.00 |

The emulsion was prepared by combining ethylene acrylic acid copolymer (40.00 parts), 30% ammonium hydroxide solution (2.00 parts) and water (38.00 parts) in a reactor. The reactor was closed and the product temperature was raised to 95° C. with continuous high shear mixing. The product temperature and shear environment were maintained for 10 minutes. Separately water (20.00 parts) was heated to 95° C. and then injected into the reactor. The product temperature and shear environment were maintained for a further 10 minutes. The product was cooled to room temperature with continuous mixing. The resulting product had a pH of 8.7, had a Brookfield viscosity of 220 cp, and showed a narrow particle size distribution centered at 0.2 μm.

Example 17: A Surfactant-Free Emulsion of a Mixture of Ethylene Acrylic Acid Copolymers Example 17 is an oil-in-water emulsion of a mixture of ethylene acrylic acid copolymers formulated at 35% by weight of the copolymers. The first copolymer (EAA1) possesses 10% acrylic acid by weight and has a number average molecular weight of approximately 1100 Daltons. The second copolymer (EAA2) possesses 20% acrylic acid by weight and has a number average molecular weight of approximately 2250 Daltons. A surfactant-free emulsion of the copolymer was created by partial conversion of the copolymers to their soaps through the use of a base. In this example an organic base, 2-amino-2-methyl-1-propanol, was used, however many other inorganic and organic bases are suitable. The formulation of Example 17 is described in Table 7.

TABLE 7

Emulsion Formulation of Example 17

| Component | Weight (%) |
|---|---|
| Ethylene Acrylic Acid Copolymer EAA1 | 29.75 |
| Ethylene Acrylic Acid Copolymer EAA2 | 5.25 |
| 2-Amino-2-Methyl-1-Propanol | 2.64 |
| Water | 62.36 |

The emulsion was prepared by combining the ethylene acrylic acid copolymer EAA1 (29.75 parts), ethylene acrylic acid copolymer EAA2 (5.25 parts), 2-amino-2-methyl-1-propanol (2.64 parts) and water (32.36 parts) were combined in a reactor.

The reactor was closed and the product temperature was raised to 95° C. with continuous high shear mixing. The product temperature and shear environment were maintained for 10 minutes.

Separately water (30.00 parts) was heated to 95° C. and then injected into the reactor.

The product temperature and shear environment were maintained for a further 10 minutes.

The product was cooled to room temperature with continuous mixing. The characteristics of the resulting product were found to be similar to those of the emulsion of Example 16.

Example 18: An Emulsion of an Ethylene Acrylic Acid Copolymer

Example 18 is an oil-in-water emulsion of a single ethylene acrylic acid copolymer formulated at 52.75% by weight of the copolymer. The copolymer possesses 15% acrylic acid by weight and has a number average molecular weight of approximately 2000 Daltons. The emulsion is stabilized through a combination of the soap of the copolymer and an anionic surfactant. The soap of the copolymer was created in-situ using potassium hydroxide, for which a 45% aqueous solution was used in the preparation to facilitate its use and accurate addition, while the anionic surfactant was JPHOS® 1066 (J1 Technologies, Manchester, UK). The formulation of Example 18 is described in Table 8.

TABLE 8

Emulsion Formulation of Example 18

| Component | Weight (%) |
|---|---|
| Ethylene Acrylic Acid Copolymer | 52.75 |
| 45% Potassium Hydroxide Solution | 2.70 |
| JPHOS ® 1066 | 1.08 |
| Water | 43.37 |
| Glacial Acetic Acid | 0.10 |

The emulsion was prepared by combining the ethylene acrylic acid copolymer (52.75 parts) and water (28.50 parts) were combined in a reactor. The reactor was closed and the product temperature was raised to 110° C. with continuous high shear mixing. The product temperature and shear environment were maintained for 10 minutes.

An aliquot of the 45% potassium hydroxide solution (0.50 parts) was injected into the reactor. The JPHOS® 1066 (1.08 parts) was injected into the reactor. The balance of the 45% potassium hydroxide solution (2.20 parts) was injected into the reactor. The product temperature and shear environment were maintained for 20 minutes.

Separately a dilute acetic acid solution was prepared from water (14.87 parts) and glacial acetic acid (0.10 parts), and heated to 95° C.

The hot dilute acetic acid solution was then injected into the reactor.

The product temperature and shear environment were maintained for a further 10 minutes.

The product was cooled to room temperature with continuous mixing.

The resulting product had a pH of 7.9, had a Brookfield viscosity of 3000 cp, and displayed a narrow particle size distribution centered at 0.2 μm.

Example 19: An Emulsion of a Mixture of an Ethylene Acrylic Acid Copolymer and a Mineral Oil The inclusion of a mineral oil in an adhesive, ink or coating composition is often economically or technically advantageous. This example illustrates the preparation of an emulsion of a mixture of ethylene acrylic acid copolymer and a mineral oil.

Example 19 is an oil-in-water emulsion of an ethylene acrylic acid copolymer and a mineral oil formulated at 49.90% by weight of the copolymer and 2.85% by weight of the oil. The copolymer possesses 15% acrylic acid by weight and has a number average molecular weight of approximately 2000 Daltons. The selected mineral oil was SIPMED® 15 (SIP, London, UK). The emulsion is stabilized through a combination of the soap of the copolymer and an anionic surfactant. The soap of the copolymer was created in-situ using potassium hydroxide, for which a 45% aqueous solution was used in the preparation to facilitate its use and accurate addition, while the anionic surfactant was JPHOS® 1066 (J1 Technologies, Manchester, UK). The formulation of Example 19 is described in Table 9.

TABLE 9

Emulsion Formulation of Example 19

| Component | Weight (%) |
|---|---|
| Ethylene Acrylic Acid Copolymer | 49.90 |
| SIPMED ® 15 | 2.85 |
| 45% Potassium Hydroxide Solution | 2.70 |
| JPHOS ® 1066 | 1.08 |
| Water | 43.37 |
| Glacial Acetic Acid | 0.10 |

The emulsion was prepared by combining The ethylene acrylic acid copolymer (49.90 parts), SIPMED® 15 (2.85 parts) and water (28.50 parts) were combined in a reactor.

The reactor was closed and the product temperature was raised to 110° C. with continuous high shear mixing. The product temperature and shear environment were maintained for 10 minutes.

An aliquot of the 45% potassium hydroxide solution (0.50 parts) was injected into the reactor. The JPHOS® 1066 (1.08 parts) was injected into the reactor.

The balance of the 45% potassium hydroxide solution (2.20 parts) was injected into the reactor.

The product temperature and shear environment were maintained for 20 minutes.

Separately a dilute acetic acid solution was prepared from water (14.87 parts) and glacial acetic acid (0.10 parts), and heated to 95° C.

The hot dilute acetic acid solution was then injected into the reactor.

The product temperature and shear environment were maintained for a further 10 minutes.

The product was cooled to room temperature with continuous mixing.

The characteristics of the resulting product were found to be similar to those of the emulsion Example 18.

Example 20: An Emulsion of a Mixture of Ethylene Acrylic Acid Copolymer and Oxidized Polyethylene Homopolymer Example 20 is an oil-in-water emulsion of an ethylene acrylic acid copolymer and an oxidized polyethylene homopolymer. It was formulated at 10.73% by weight of the copolymer, 32.17% by weight of the oxidized polyethylene and includes 3.23% by weight of a mineral oil. The copolymer possesses 15% acrylic acid by weight and has a number average molecular weight of approximately 2000 Daltons. The oxidized polyethylene has a number average molecular weight of approximately 1200 Daltons and an acid number of 15 mg KOH/g. The selected mineral oil was SIPMED® 15 (SIP, London, UK). The emulsion is stabilized through a combination of the soap of the copolymer and an anionic surfactant. The soap of the copolymer was created in-situ using potassium hydroxide, for which a 45% aqueous solution was used in the preparation to facilitate its use and accurate addition, while the anionic surfactant was JPHOS® 1066 (J1 Technologies, Manchester, UK). A wetting agent and a biocide are also included in the formulation. The wetting agent was JMULSE® 1444B3 (J1 Technologies, Manchester, UK). The biocide was ACTICIDE® MBS (Thor Specialities, Northwich, UK). The formulation of Example 20 is described in Table 10.

TABLE 10

Emulsion Formulation of Example 20

| Component | Weight (%) |
| --- | --- |
| Ethylene Acrylic Acid Copolymer | 10.73 |
| Oxidized Polyethylene Homopolymer | 32.17 |
| SIPMED ® 15 | 3.23 |
| 45% Potassium Hydroxide Solution | 2.10 |
| JPHOS ® 1066 | 1.67 |
| Water | 48.76 |
| Glacial Acetic Acid | 0.10 |
| JMULSE ® 1444B3 | 0.34 |
| ACTICIDE ® MBS | 0.90 |

Table The emulsion was prepared by combining The ethylene acrylic acid copolymer (10.73 parts), oxidized polyethylene homopolymer (32.17 parts), SIPMED® 15 (3.23 parts) and water (22.00 parts) were combined in a reactor. The reactor was closed and the product temperature increased to 110° C. with continuous high shear mixing. The product temperature and shear environment were maintained for 10 minutes. An aliquot of the 45% potassium hydroxide solution (0.30 parts) was injected into the reactor. The JPHOS® 1066 (1.67 parts) was injected into the reactor.

The balance of the 45% potassium hydroxide solution (1.80 parts) was injected into the reactor.

The product temperature and shear environment were maintained for a further 20 minutes.

Separately a dilute acetic acid solution was prepared from water (26.76 parts) and glacial acetic acid (0.10 parts).

The cold dilute acetic acid solution was then injected into the reactor.

The product temperature and shear environment were maintained for a further 10 minutes. The product was cooled to ≤40° C. with continuous mixing.

The JMULSE® 1444B3 (0.34 parts) and ACTICIDE® MBS (0.90 parts) were added with continuous mixing.

The product was then cooled to room temperature with continuous mixing.

The resulting product had a pH of 8.1, had a Brookfield viscosity of 800 cp, and showed a narrow particle size distribution centered at 0.2 μm.

Example 21: An Emulsion of a Mixture of Ethylene Acrylic Acid Copolymer and Rosin Ester The inclusion of a rosin ester in an adhesive, ink or coating composition is often economically or technically advantageous. This example illustrates the preparation of an emulsion of a mixture of ethylene acrylic acid copolymer and a rosin ester.

Example 21 is an oil-in-water emulsion of an ethylene acrylic acid copolymer and a rosin ester formulated at 38.75% by weight of the copolymer and 12.95% by weight of the rosin ester. The copolymer possesses 15% acrylic acid by weight and has a number average molecular weight of approximately 2000 Daltons. The selected rosin ester was SYLVATAC® RE85 (Arizona Chemical, Almere, The Netherlands). The emulsion is stabilized through a combination of the soap of the copolymer and an anionic surfactant. The soap of the copolymer was created in-situ using potassium hydroxide, for which a 45% aqueous solution was used in the preparation to facilitate its use and accurate addition, while the anionic surfactant was JPHOS® 1066 (J1 Technologies, Manchester, UK). The formulation of Example 21 is described in Table 11.

TABLE 11

Emulsion Formulation of Example 21

| Component | Weight (%) |
| --- | --- |
| Ethylene Acrylic Acid Copolymer | 38.75 |
| SYLVATAC ® RE85 | 12.95 |
| 45% Potassium Hydroxide Solution | 2.64 |
| JPHOS ® 1066 | 3.10 |
| Water | 42.46 |
| Glacial Acetic Acid | 0.10 |

The emulsion was prepared by combining The ethylene acrylic acid copolymer (38.75 parts), SYLVATAC® RE85 (12.95 parts) and water (28.00 parts) were combined in a reactor.

The reactor was closed and the product temperature was raised to 110° C. with continuous high shear mixing. The product temperature and shear environment were maintained for 10 minutes. An aliquot of the 45% potassium hydroxide solution (0.50 parts) was injected into the reactor. The JPHOS® 1066 (3.10 parts) was injected into the reactor The balance of the 45% potassium hydroxide solution (2.14 parts) was injected into the reactor. The product temperature and shear environment were maintained for 20 minutes.

Separately a dilute acetic acid solution was prepared from water (14.46 parts) and glacial acetic acid (0.10 parts), and heated to 85° C. The dilute acetic acid solution was then injected into the reactor.

The product temperature and shear environment were maintained for a further 10 minutes. The product was cooled to room temperature with continuous mixing.

The resulting product had a pH of 8.5, had a Brookfield viscosity of 1500 cp, and showed a narrow particle size distribution centered at 0.2 μm.

What is claimed is:

1. An adhesion composition comprising:
   (a) a first polymer, having a number average molecular weight greater than about 50,000 Daltons but not greater than about 100,000 Daltons, and chosen from acrylic polymers comprising a majority component of either 2-ethylhexylacrylate or butyl acrylate copolymerized with a minority component of either methyl methacrylate, vinyl acetate, or styrene;
   (b) a second polymer different than said first polymer, having a number average molecular weight less than about 20,000 Daltons, and consisting of ethylene-acrylic acid copolymers in combination with an oxidized polyethylene polymer;
   (c) surfactant in an amount of about 0.05% to about 0.5%; and
   (d) water, where the amount of said water, said first polymer and said second polymer is sufficient to provide the composition with a solids content of greater than about 30% based on the total weight of components (a)-(d) in the adhesion composition and where said first polymer and said second polymer comprise solid particles having a D50 particle size of from about 10 nanometers (nm) to about 2000 nm.

2. The composition of claim 1 wherein said first polymer and said second polymer comprise solid particles having a D50 particle size of from about 30 nm to about 600 nm.

3. The composition of claim 1 wherein said first polymer and said second polymer comprise solid particles having a D50 particle size of from about 50 nm to about 500 nm.

4. The composition of claim 3, further comprising one or more additives chosen from a tackifier resin, an anti-blocking agent, an anti-oxidant, a stabilizer, a filler, a wetting agent and a defoaming agent.

5. The composition of claim 4 wherein:
   (i) the first polymer is present in an amount from about 50 weight % to about 98.5 weight % of the total dry weight of the composition;
   (ii) the tackifier resin is present in an amount greater than 0 weight % to about 40 weight % of the total dry weight of the composition; and
   (iii) the second polymer is present in an amount from about 2.5 weight % and about 25 weight % of the total dry weight of the composition.

6. The composition of claim 5 in the form of an emulsion having a solids content of from about 30% to about 60% by weight based on the total weight of the composition.

7. A high-performance heat seal adhesive comprising the composition of claim 5.

8. A water-based ink comprising the composition of claim 1 wherein the solids content is greater than about 50% by weight based on the total weight of the composition.

9. A primer composition comprising the composition of claim 1.

10. An intercoat composition comprising the composition claim 1.

11. A water-based flexographic ink comprising the composition of claim 1.

12. A method of improving the cohesive and adhesive strength of a water-based material comprising adding an amount of the composition of claim 1 to said water-based material whereby at least one of the cohesive and adhesive strength of the water-based material is increased.

* * * * *